United States Patent [19]

Ogawa

[11] Patent Number: 5,612,873
[45] Date of Patent: Mar. 18, 1997

[54] SPEED RATIO CONTROL METHOD AND DEVICE FOR CONTINUOUSLY VARIABLE TRANSMISSION

[75] Inventor: Sumitaka Ogawa, Saitama, Japan

[73] Assignee: Honda Giken Kogyo Kabushiki Kaisha, Tokyo, Japan

[21] Appl. No.: 168,380

[22] Filed: Dec. 17, 1993

[30] Foreign Application Priority Data

Dec. 17, 1992 [JP] Japan .................................. 4-337681

[51] Int. Cl.$^6$ .............................. G06G 7/70; B60K 23/00
[52] U.S. Cl. ............................. 364/424; 477/48; 477/49; 477/43; 477/46; 474/12; 474/18
[58] Field of Search .......................... 364/424.1, 424.01, 364/426.04, 424.02, 161, 566, 565, 569; 477/154, 155, 45, 33, 58, 97, 37, 49, 68, 176, 179, 43, 901, 44, 48, 46, 107, 32, 78, 71, 85; 192/21.5, 4 R; 60/431, 437, 449; 475/76, 80; 474/11, 18, 12

[56] References Cited

U.S. PATENT DOCUMENTS

| 4,515,040 | 5/1985 | Takeuchi et al. | 477/43 |
|---|---|---|---|
| 4,543,077 | 9/1985 | Yamamuro et al. | 477/43 |
| 4,593,582 | 6/1986 | Sawada et al. | 364/424.1 |
| 4,622,865 | 11/1986 | Itoh et al. | 364/424.1 |
| 4,627,311 | 12/1986 | Yokooku et al. | 364/424.1 |
| 4,637,280 | 1/1987 | Oshiage | 364/424.1 |
| 4,649,485 | 3/1987 | Osanai et al. | 364/424.1 |
| 4,649,487 | 3/1987 | Osanai et al. | 364/424.1 |
| 4,649,488 | 3/1987 | Osanai et al. | 364/424.1 |
| 4,663,991 | 5/1987 | Nakamura et al. | 477/49 |
| 4,811,222 | 3/1989 | Watanabe et al. | 364/424.1 |
| 4,875,892 | 10/1989 | Sueda | 474/17 |
| 4,893,526 | 1/1990 | Tokoro | 477/43 |
| 4,945,481 | 7/1990 | Iwatsuki et al. | 364/424.1 |
| 4,945,482 | 7/1990 | Nishikawa et al. | 364/424.1 |
| 4,967,610 | 11/1990 | Sasajima et al. | 364/424.1 |
| 5,069,083 | 12/1991 | Hirano et al. | 477/39 |
| 5,073,859 | 12/1991 | Suzuki | 364/424.1 |

FOREIGN PATENT DOCUMENTS 352110  7/1989  European Pat. Off. .

OTHER PUBLICATIONS

Physics for Science and Engineering, Part 1 Marion & Hornyak p. 268 no date.

Primary Examiner—Kevin J. Teska
Assistant Examiner—Jacques Louis-Jacques

[57] ABSTRACT

The invention improves the driveability of a vehicle by controlling a target engine speed according to an engine load and a vehicle running condition to ensure an actual engine speed. In controlling a speed ratio of a continuously variable transmission, an adaptation factor is used for deciding a target engine speed, the adaptation factor is determined according to constants, an average engine load and an average vehicle speed change quantity. Even when the average engine load changes because of fluctuation in an accelerator opening, various running modes can be decided by the adaptation factor depending upon both the average engine load and the average vehicle speed change quantity, thereby improving driveability upon changing speed of the continuously variable transmission.

60 Claims, 27 Drawing Sheets

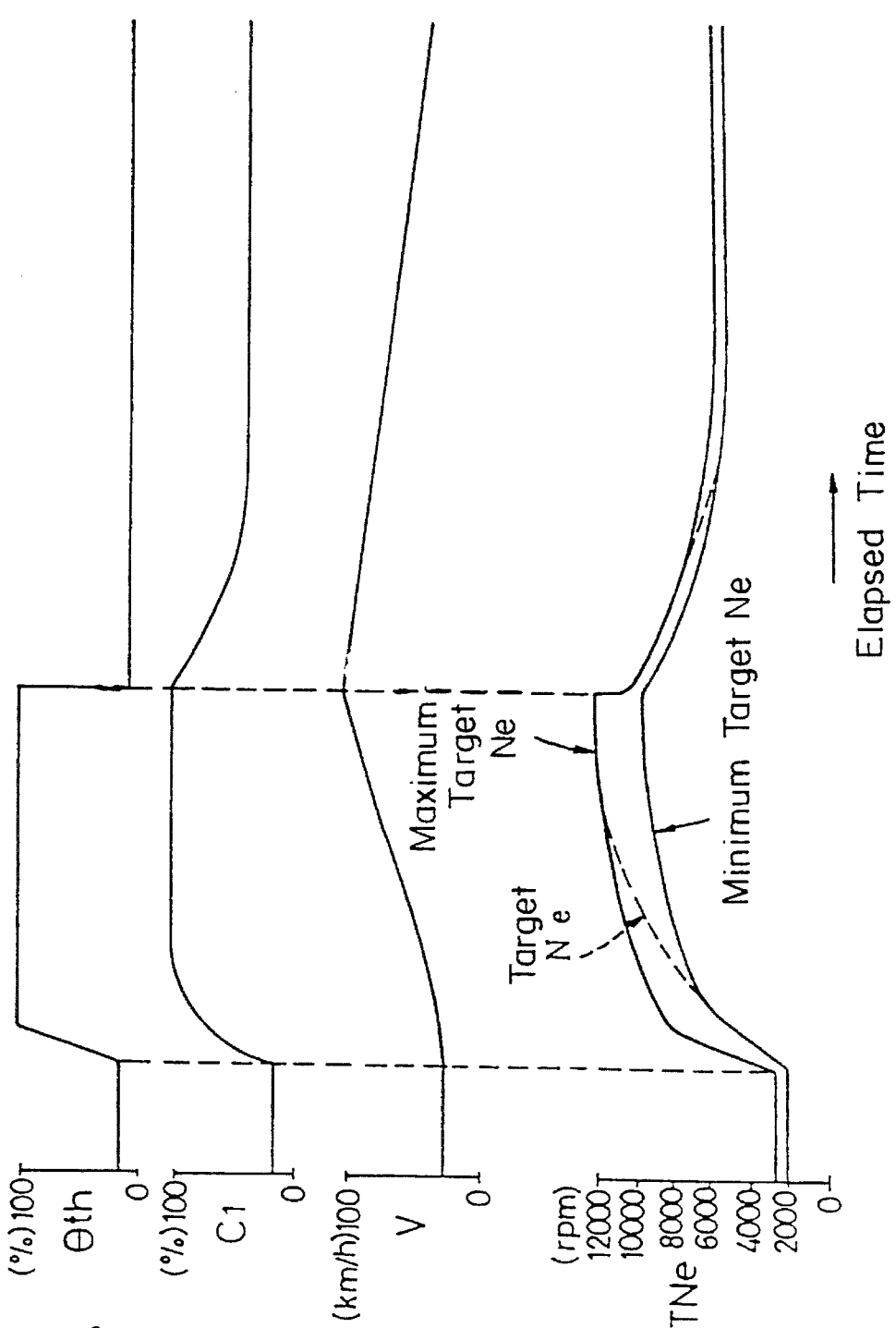

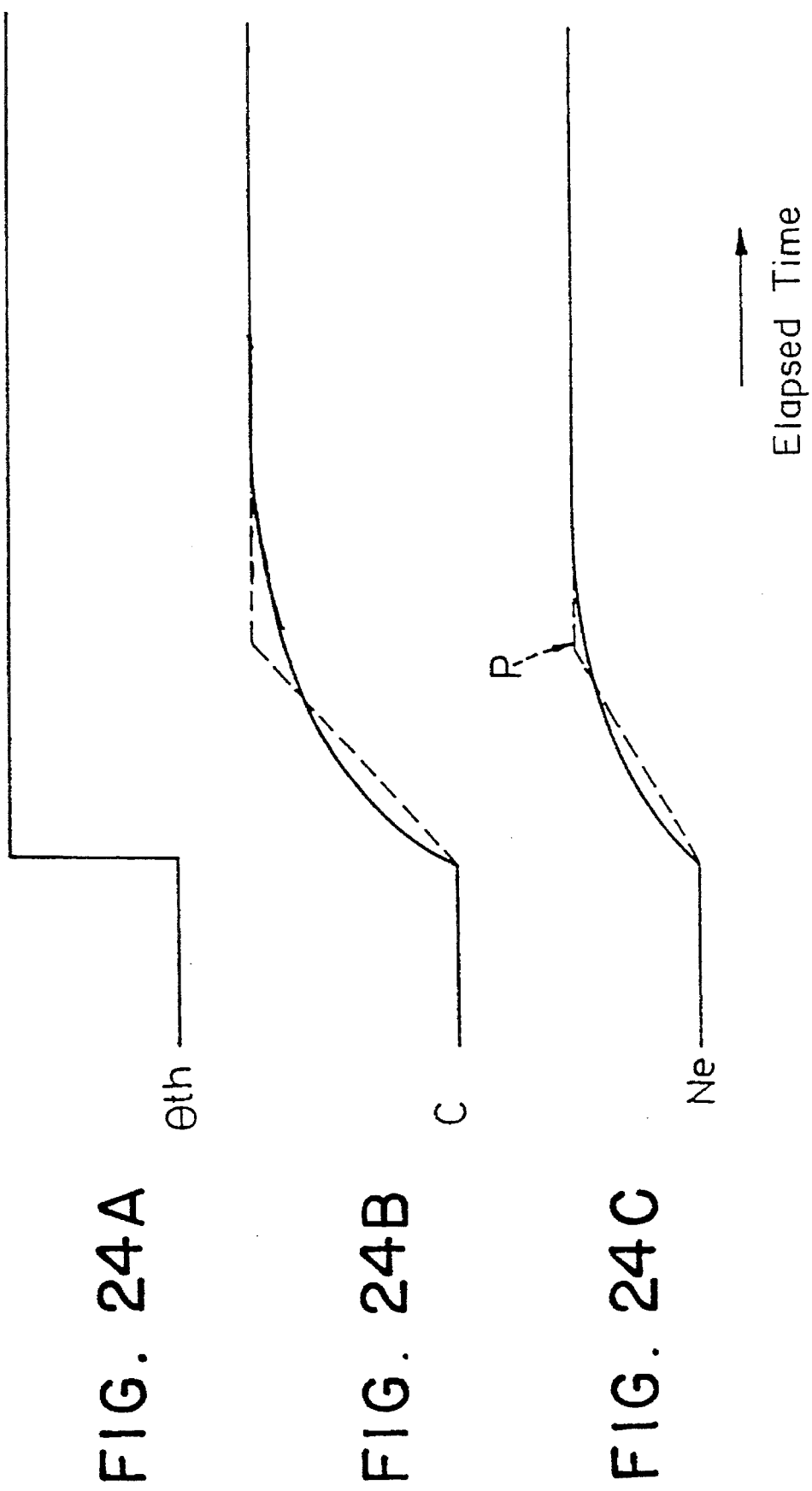

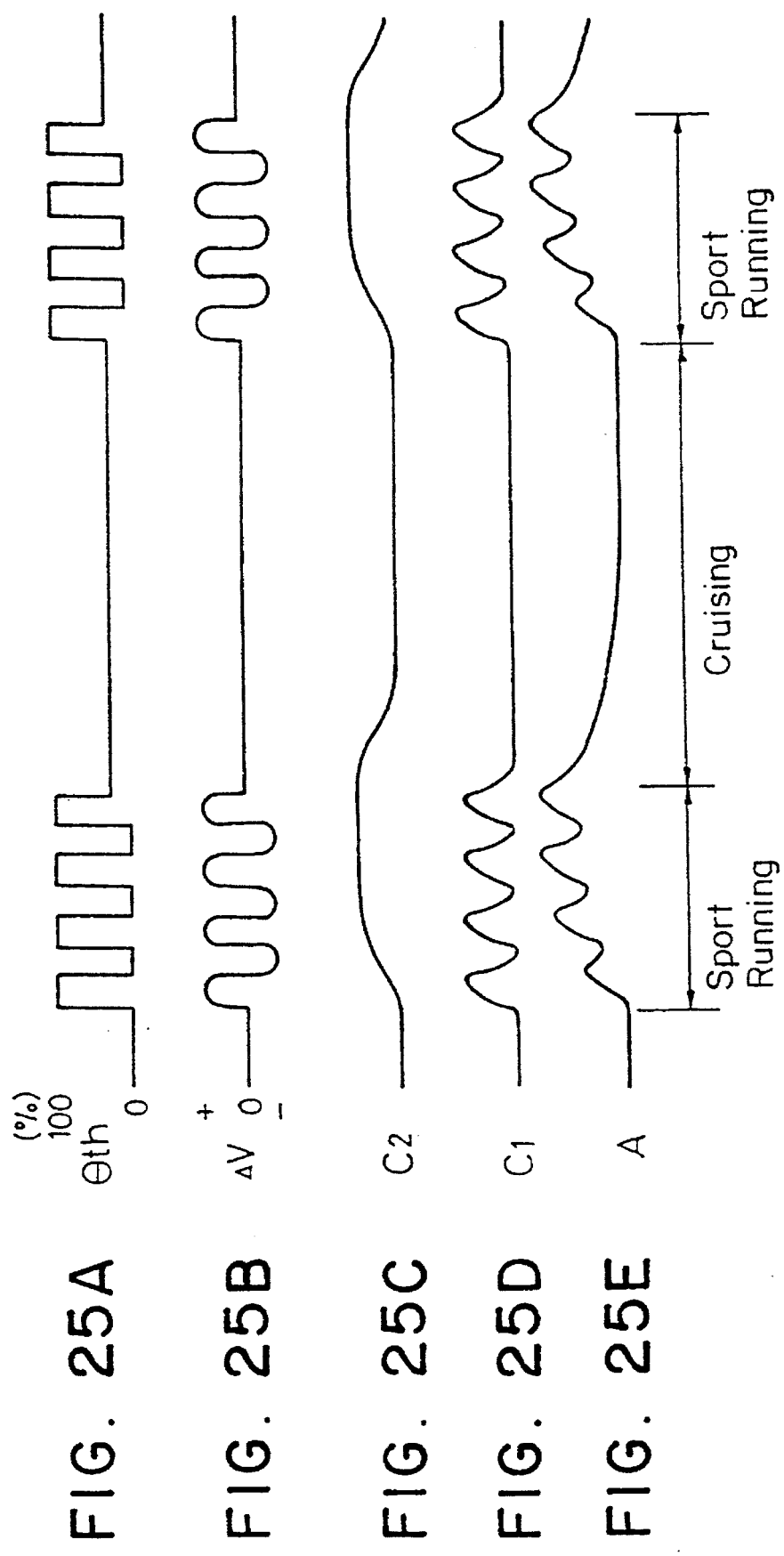

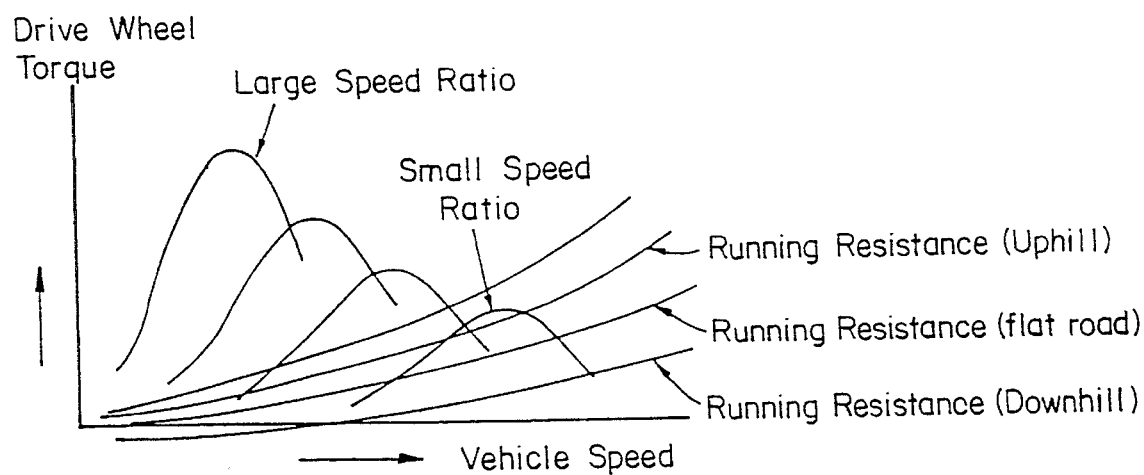
FIG. 27
FIG. 28
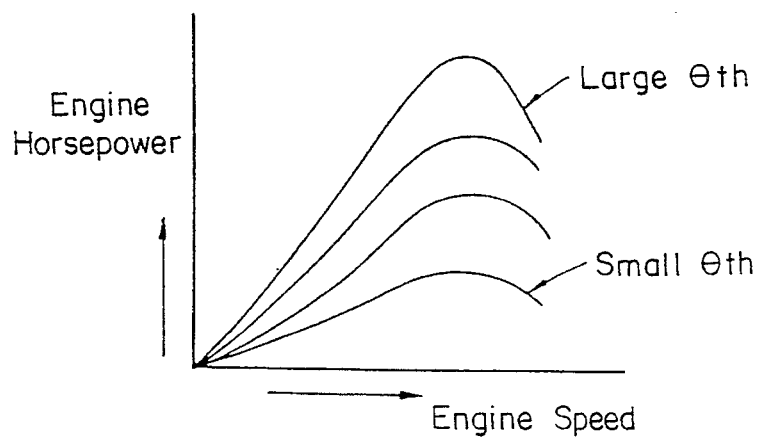

SPEED RATIO CONTROL METHOD AND DEVICE FOR CONTINUOUSLY VARIABLE TRANSMISSION

BACKGROUND OF THE INVENTION

1. Field of the Invention

The present invention relates to a speed ratio control method for a continuously variable transmission, and more particularly to a speed ratio control method for a continuously variable transmission to optimally control a target engine speed in relation to an engine load.

2. Description of the Background Art

As a method of controlling a target engine speed in relation to an engine load, it is known to provide a plurality of maps for retrieving the target engine speed according to a throttle opening and correct a rate of shifting to the target engine speed according to a change in running condition (e.g., Japanese Patent Laid-open Publication No. 62-12430).

Although the rate of shifting of the target engine speed is corrected according to a change in running condition as in the above conventional method, it is difficult to properly control the target engine speed according to a driving condition only by retrieving the plural maps according to a throttle opening. Furthermore, in some cases, a change in engine load directly affects the behavior of a vehicle, and a desired drive feeling cannot accordingly be obtained.

SUMMARY OF THE INVENTION

In view of the above circumstances, it is an object of the present invention to provide a speed ratio control method for a continuously variable transmission which can obtain a target engine speed according to a driving condition by performing driving condition adaptive control according to an adaptation factor.

A first embodiment of the-present invention is to retrieve a map for obtaining a target engine speed according to an adaptation factor and control the continuously variable transmission so that an engine speed becomes the target engine speed.

A second embodiment of the present invention is to compute an adaptation factor according to a function of an engine load component and time, compute a target engine speed according to the adaptation factor, and control the continuously variable transmission so that an engine speed becomes the target engine speed.

A third embodiment of the present invention is to compute an adaptation factor according to an engine load component and a vehicle body change quantity component, compute a target engine speed according to the adaptation factor, and control the continuously variable transmission so that an engine speed becomes the target engine speed.

In addition to the first, second, and third embodiments, a fourth embodiment of the present invention is that a vehicle body change quantity component of the adaptation factor is set as a function of an average vehicle speed change quantity or an average acceleration.

In addition to the first, second, and third embodiments, a fifth embodiment of the present invention is that when an engine load is larger than an engine load component of the adaptation factor, the engine load component is increased according to a difference between the engine load and the engine load component.

In addition to the first, second, and third embodiments, a sixth embodiment of the present invention is that when an engine load is smaller than an engine load component of the adaptation factor, the engine load component is decreased according to the engine load and the adaptation factor or according to the engine load and a speed ratio of the continuously variable transmission.

In addition to the first, second, and third embodiments, a seventh embodiment of the present invention is that the target engine speed is computed by retrieving first and second target engine speeds or a vehicle speed and interpolating a result of retrieval according to the adaptation factor.

In addition to the first, second, and third embodiments, an eighth embodiment of the present invention is that the target engine speed is computed from information of a vehicle speed target engine speed characteristic using the adaptation factor as a parameter.

A ninth embodiment of the present invention is to provide a speed ratio control device for a continuously variable transmission, for feedback controlling a speed ratio of the continuously variable transmission connected to an engine so that an actual engine speed accords with a target engine speed. The speed ratio control device includes an adaptation factor computing unit for computing an adaptation factor according to a vehicle running condition; a minimum target engine speed computing unit for computing a minimum target engine speed according to a vehicle speed and the adaptation factor; a maximum target engine speed computing unit for computing a maximum target engine speed according to the vehicle speed, the adaptation factor, and an engine speed; a target engine speed change quantity computing unit for computing a target engine speed change quantity according to the vehicle speed and a vehicle speed change quantity; a target engine speed computing unit for computing a present target engine speed according to a previous target engine speed and the target engine speed change quantity; and a speed ratio control unit for feedback controlling the speed ratio of the continuously variable transmission so that the actual engine speed accords with a target value wherein the present target engine speed is set to the target value when the present target engine speed falls within a range between the minimum target engine speed and the maximum target engine speed. The minimum target engine speed is set to the target value when the present target engine speed is lower than the minimum target engine speed and the maximum target engine speed is set to the target value when the present target engine speed is higher than the maximum target engine speed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

Figure 3:
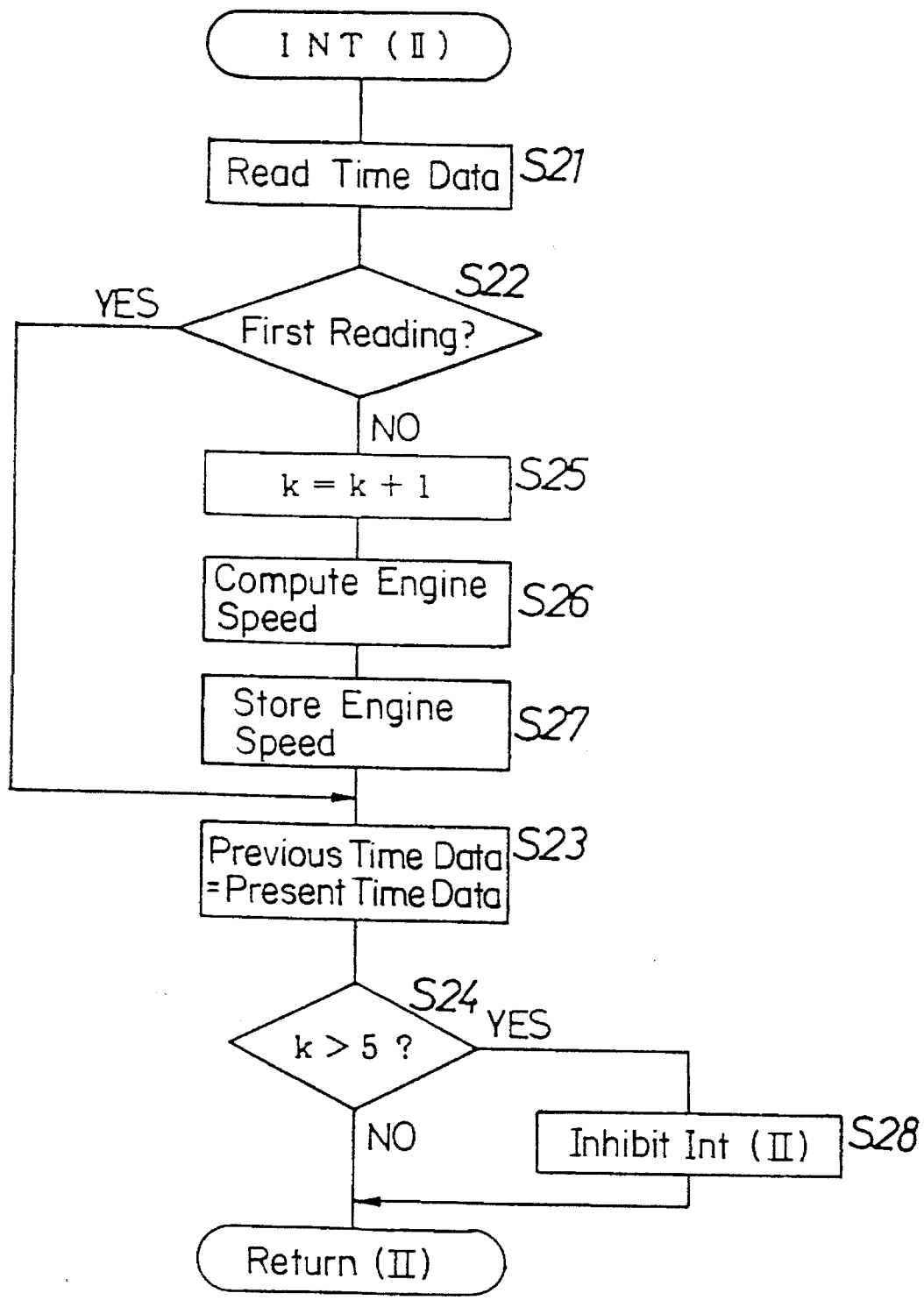
Figure 4:
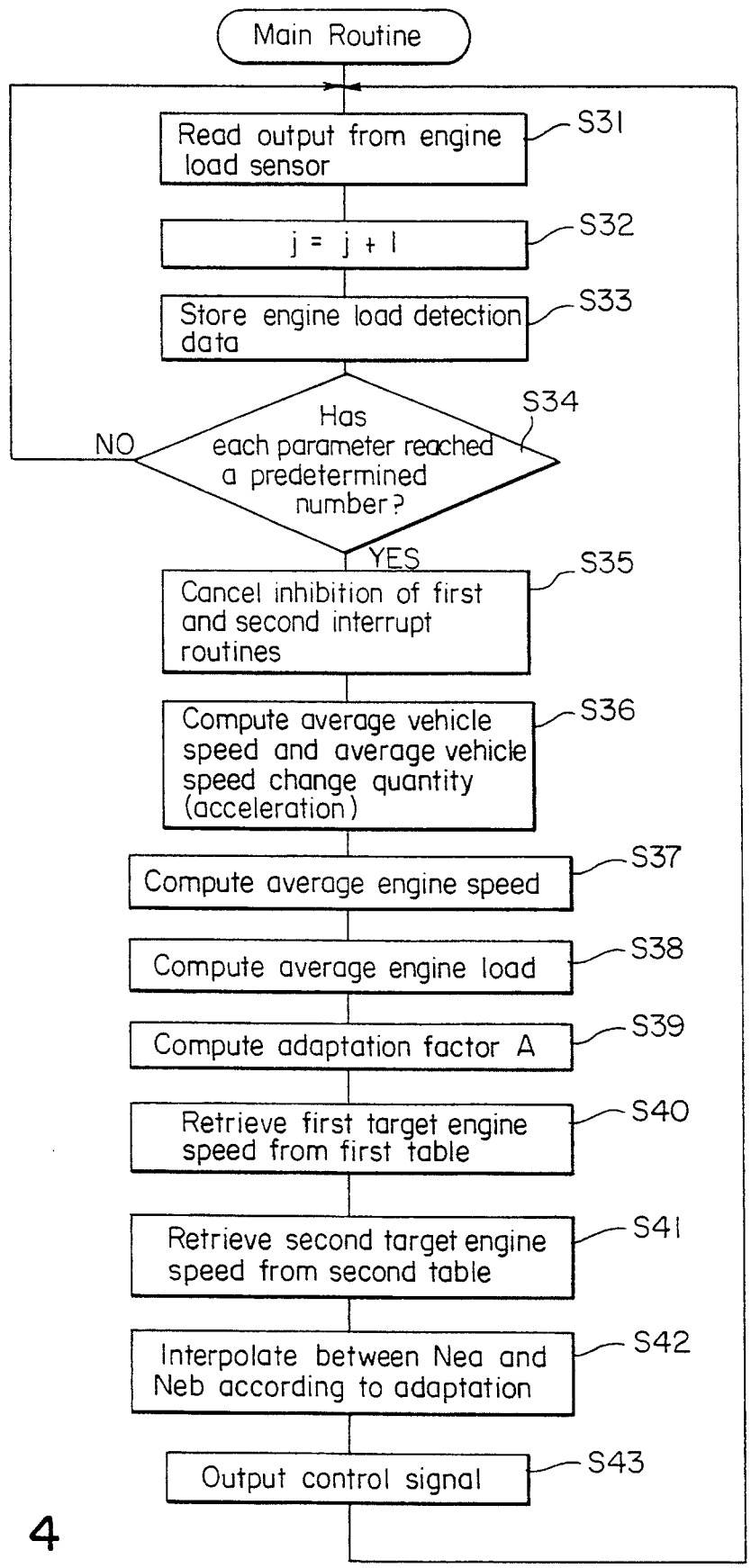
Figure 5:
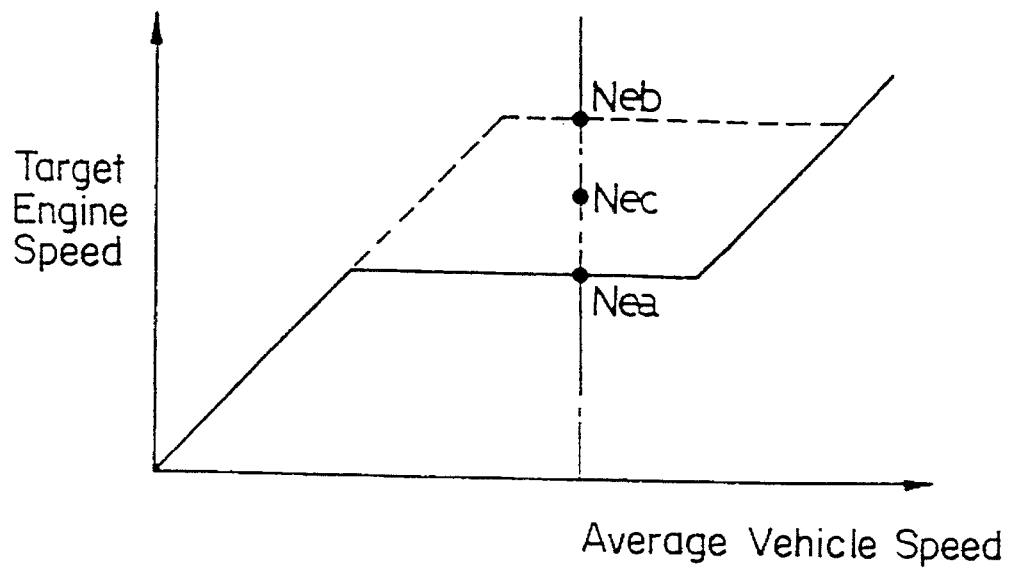
Figure 6:
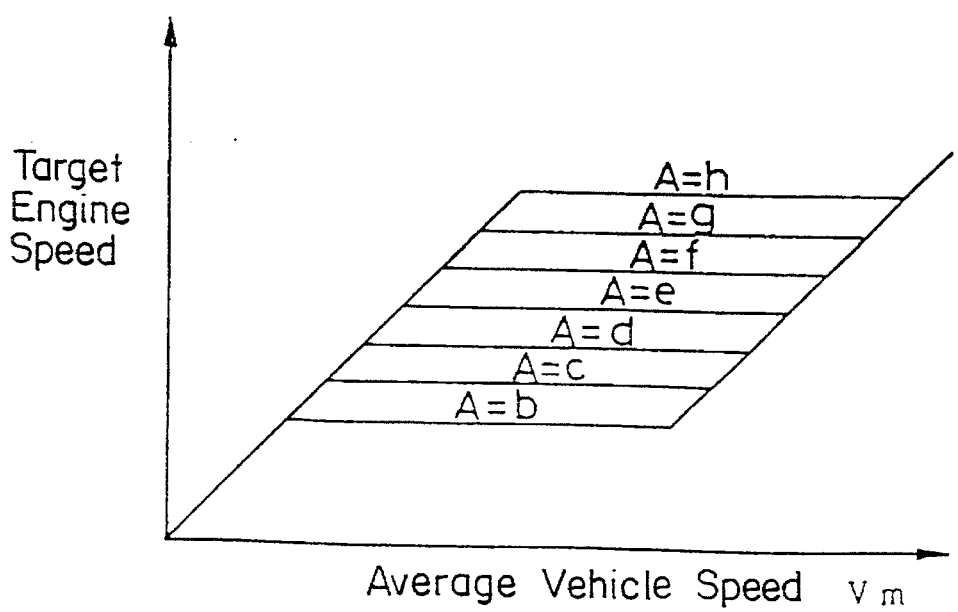
Figure 7:
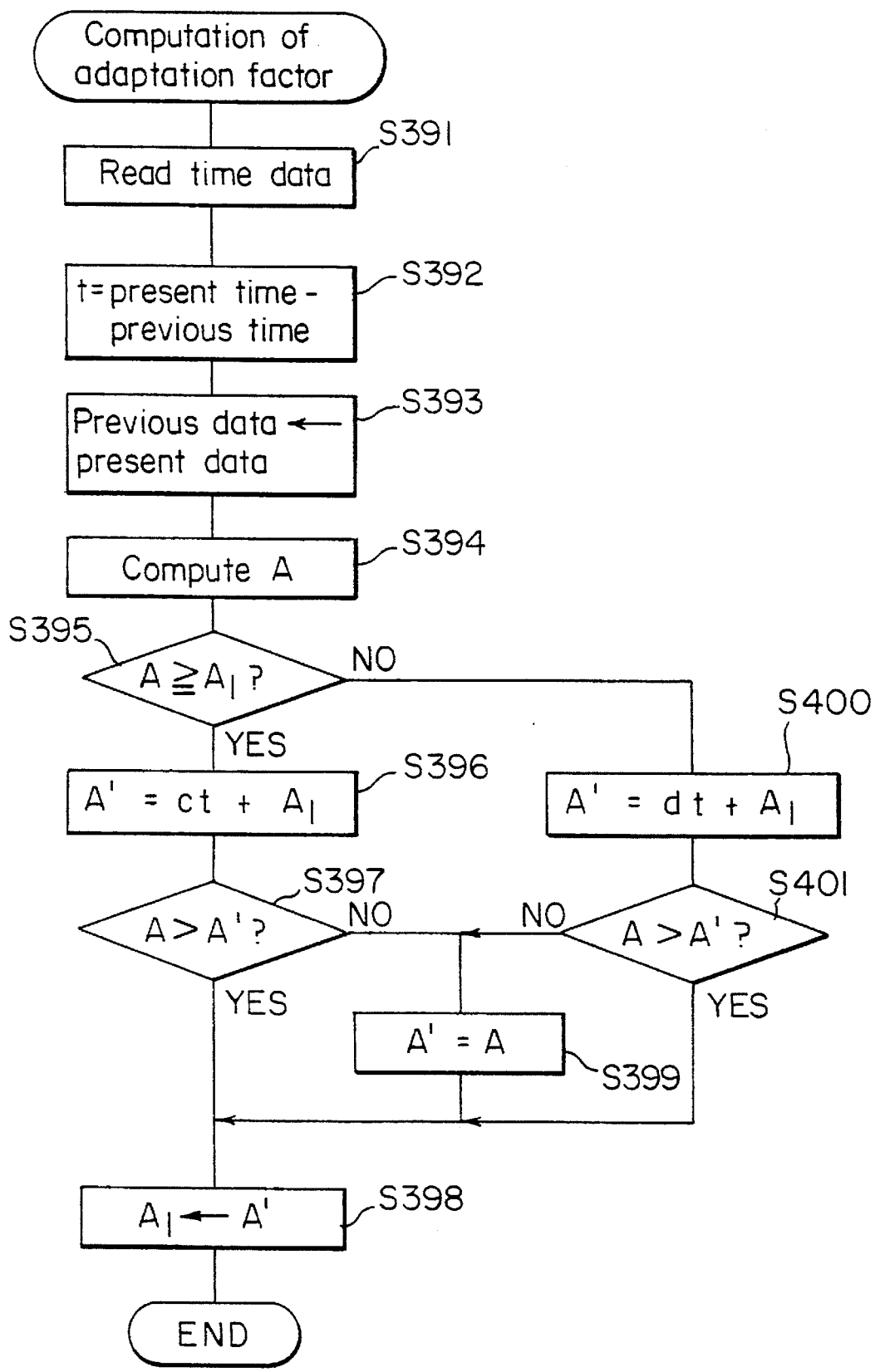
Figure 8A:
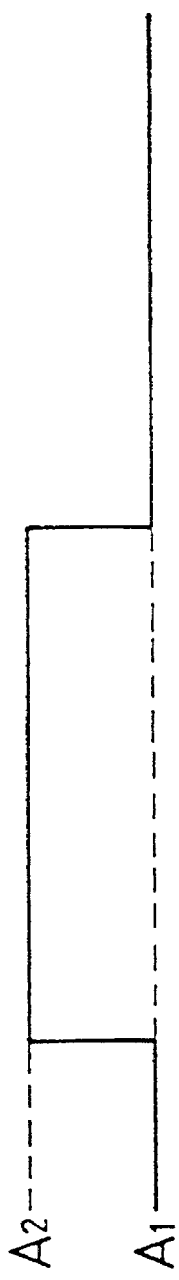
Figure 8B:
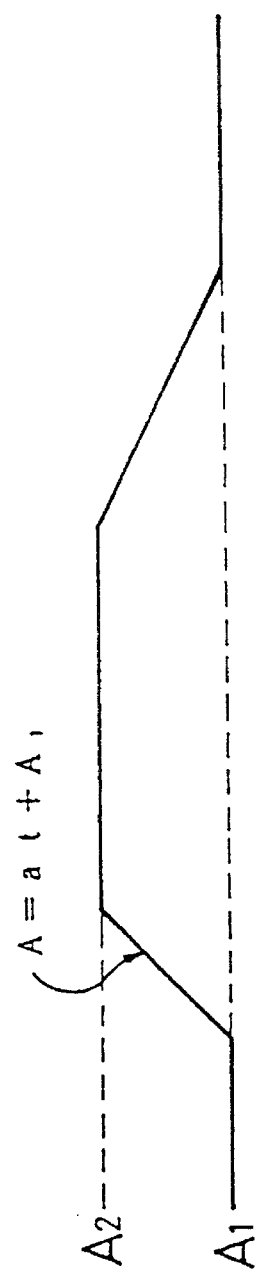
Figure 8C:
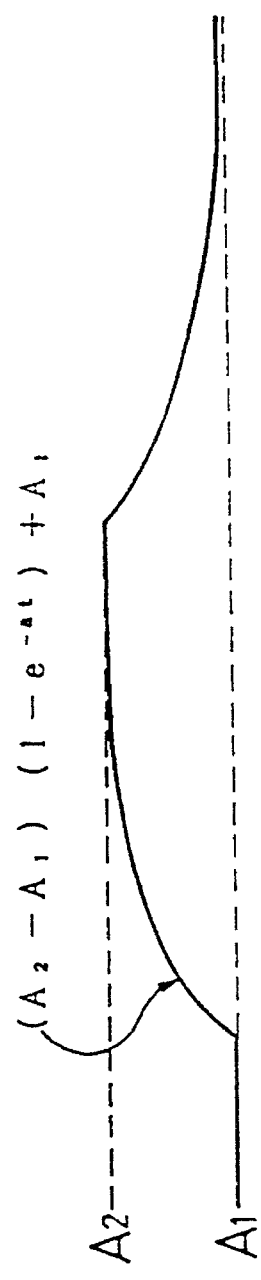
Figure 9:
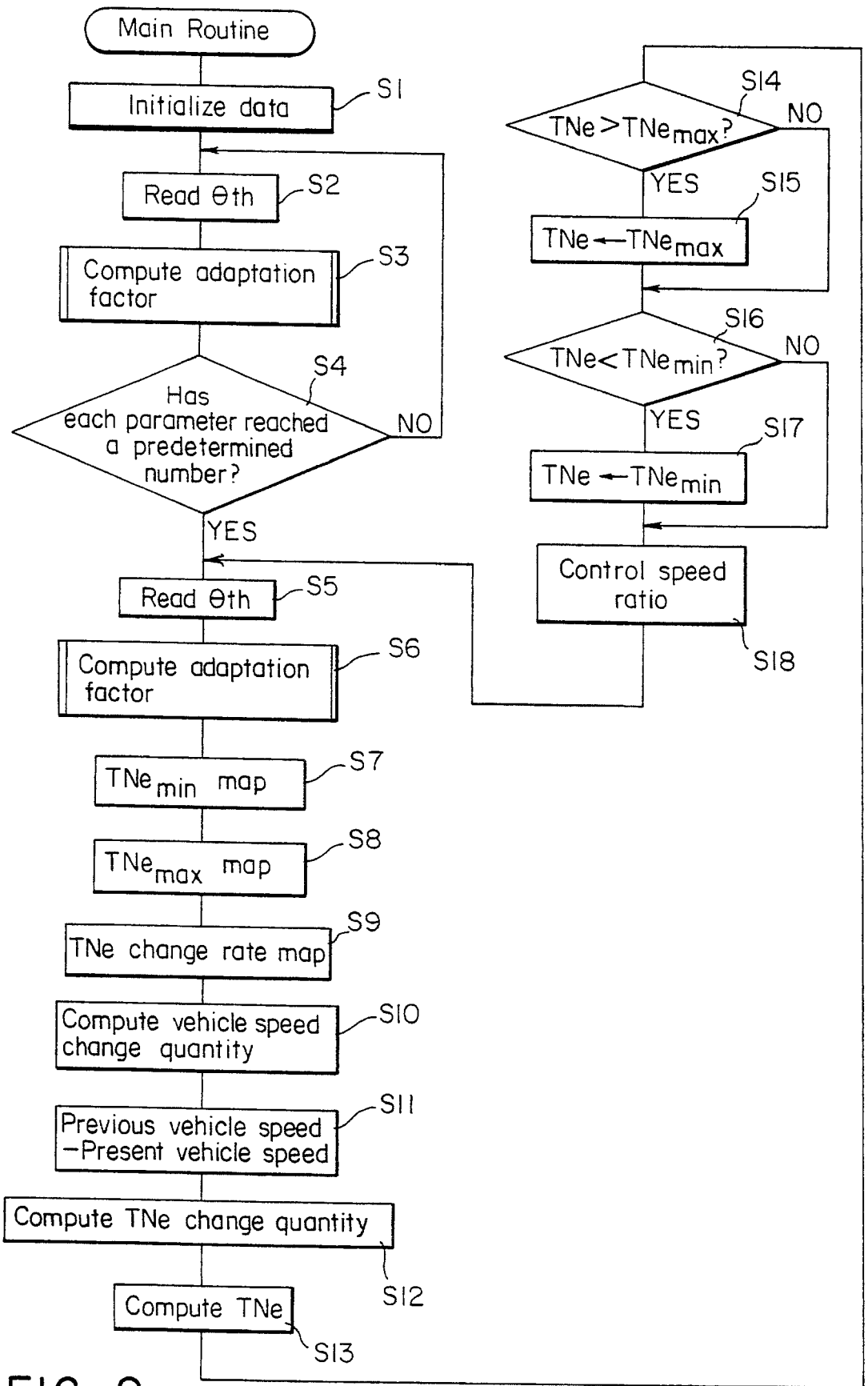
Figure 10:
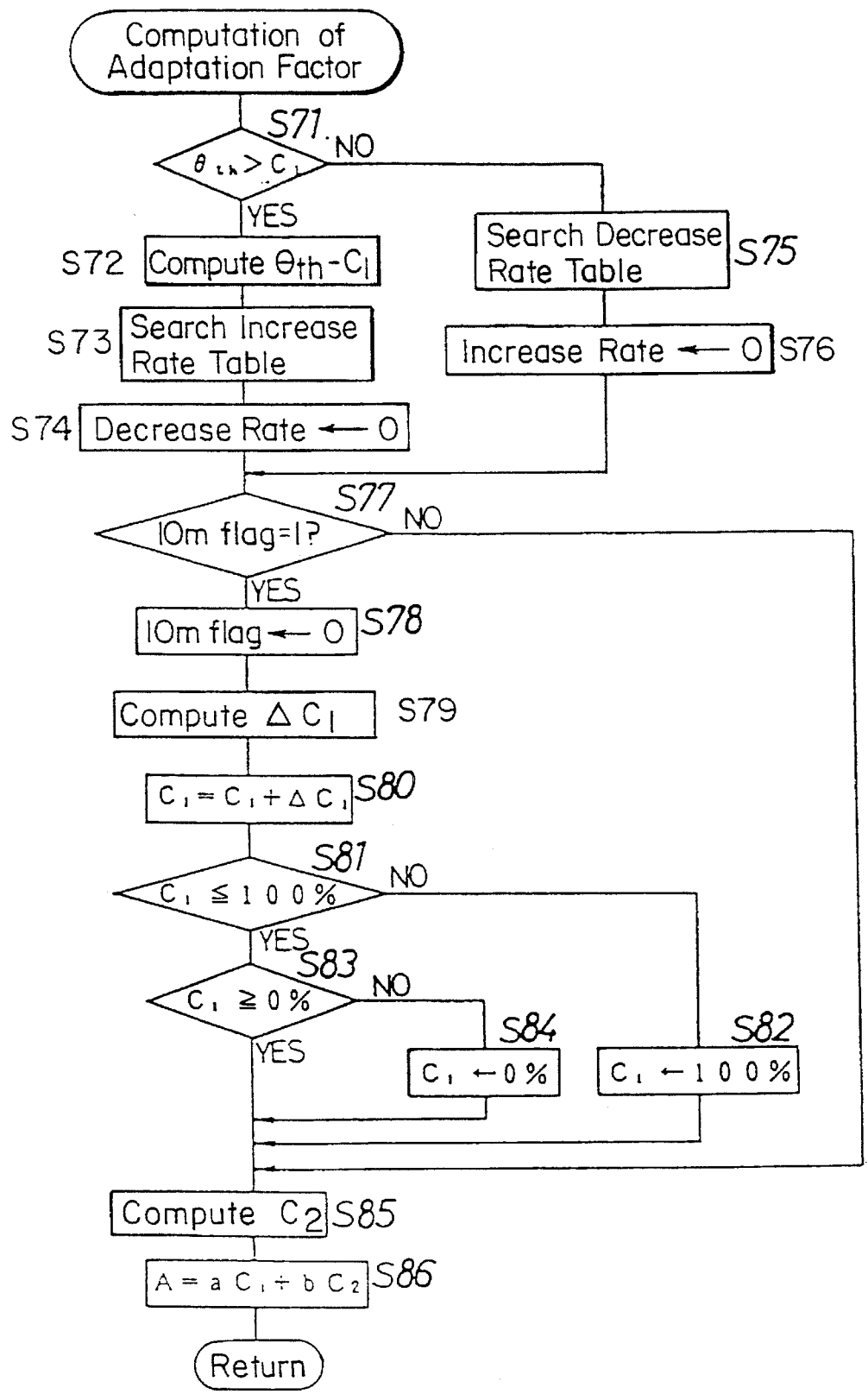
Figure 11A:
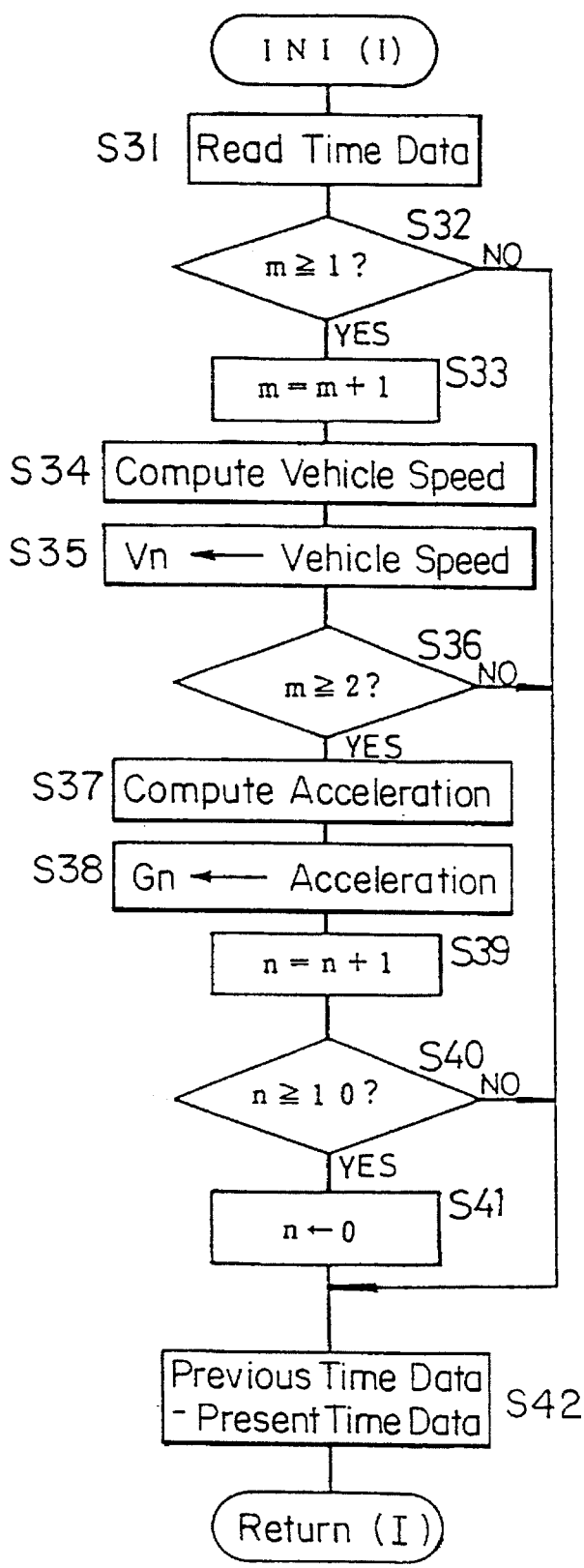
Figure 11B:
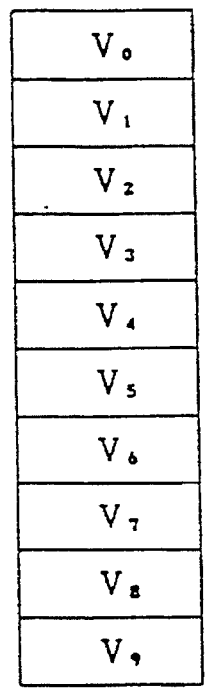
Figure 11C:
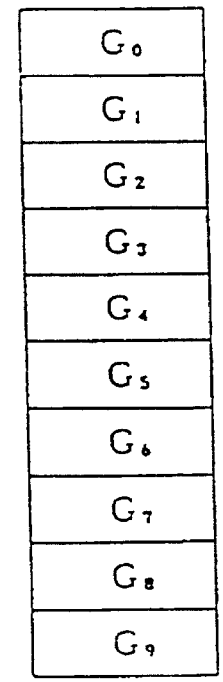
Figure 12:
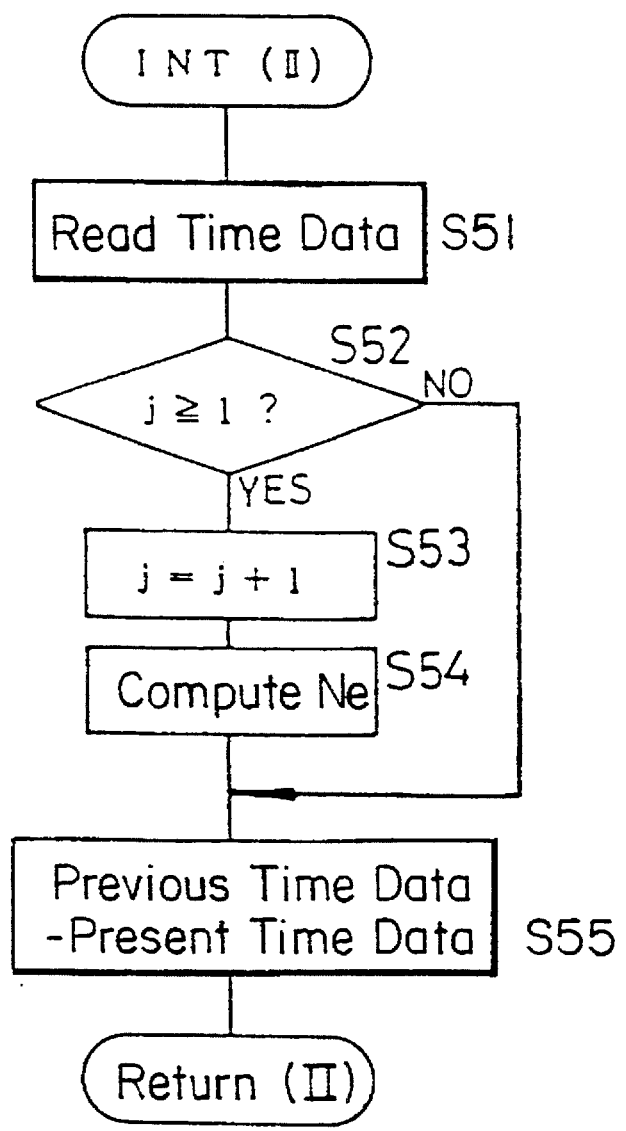
Figure 13:
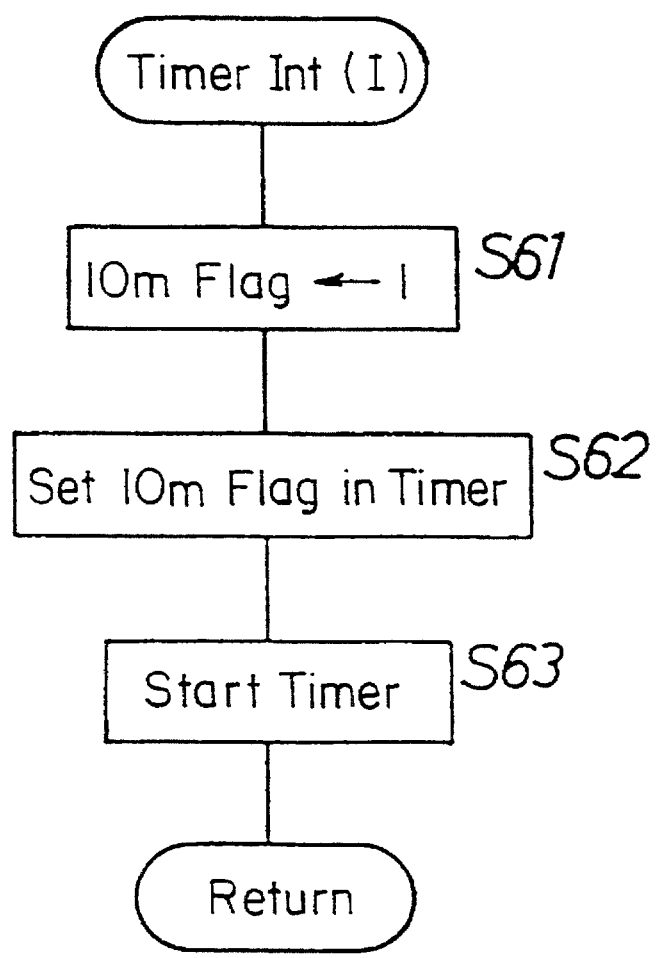
Figure 14:
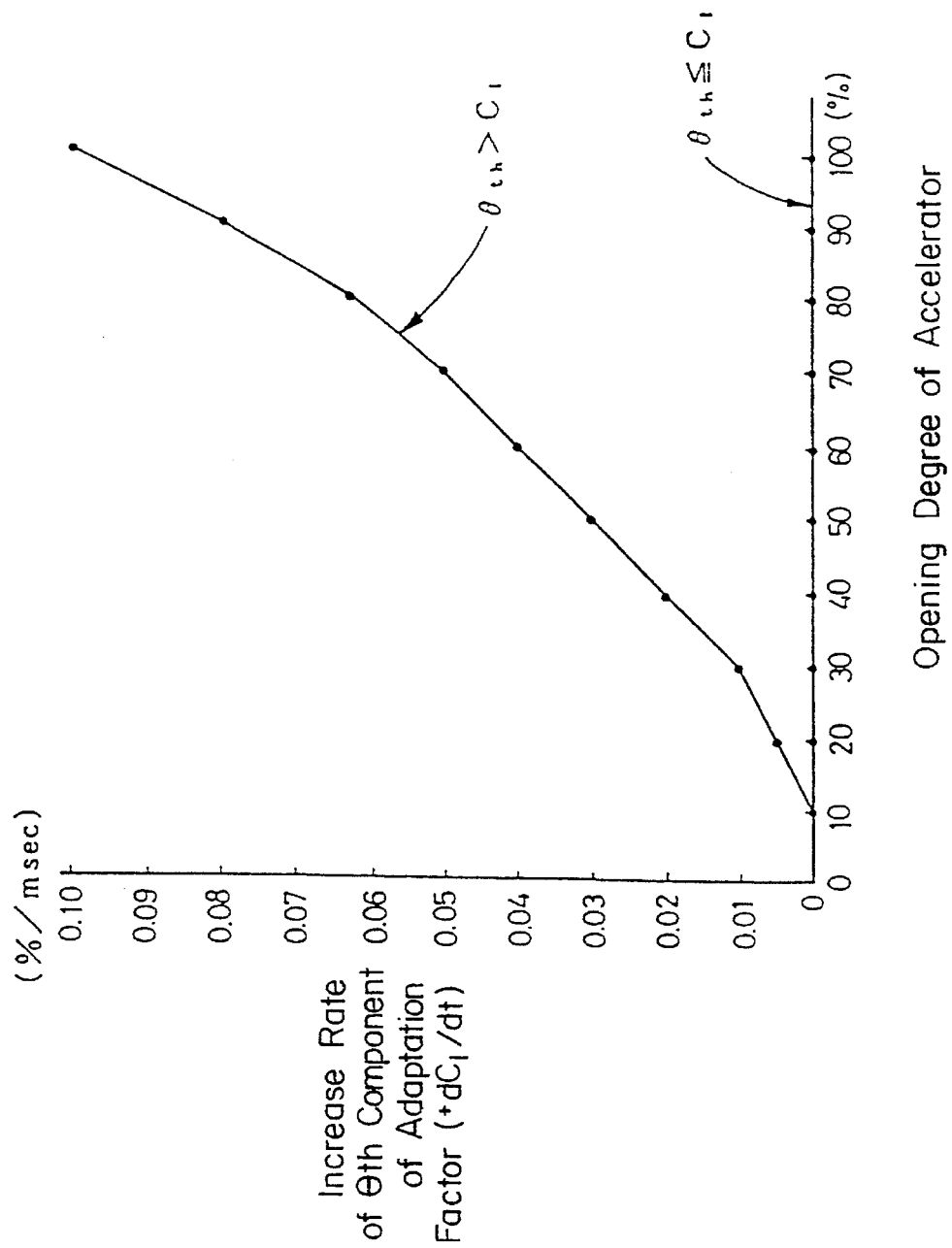
Figure 15:
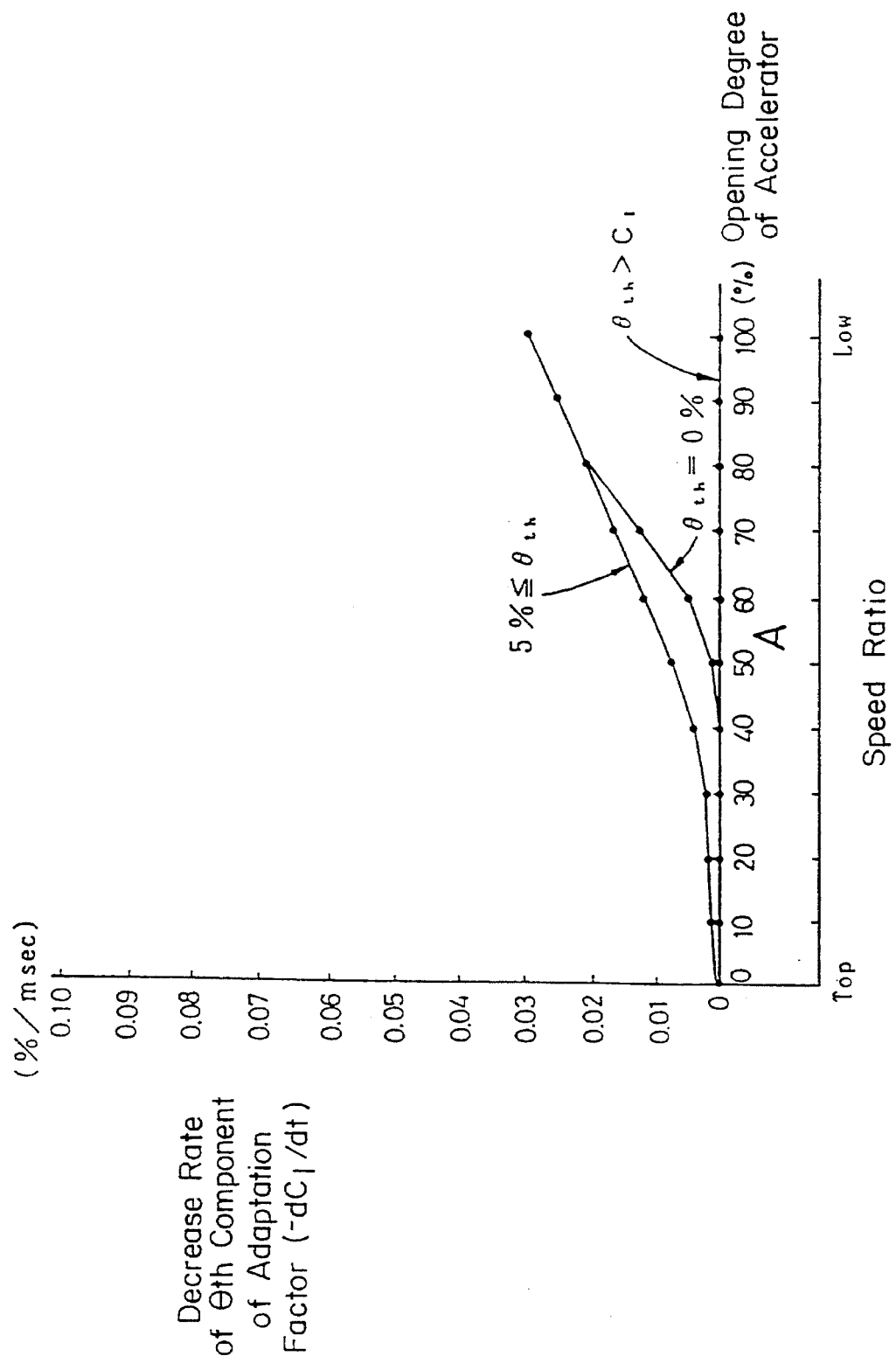
Figure 16:
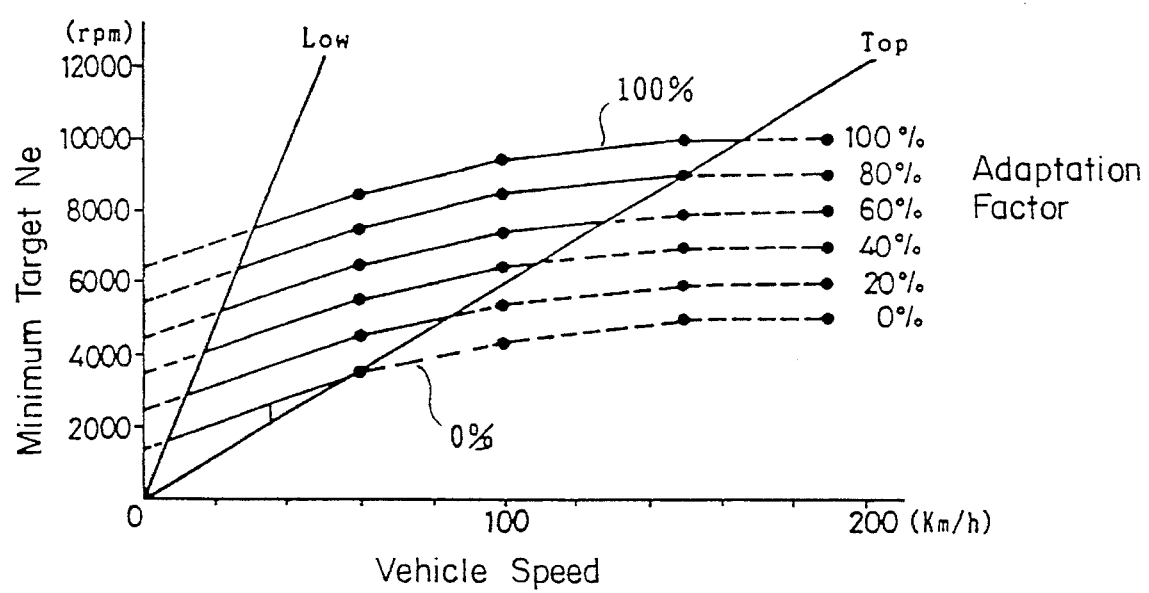
Figure 17:
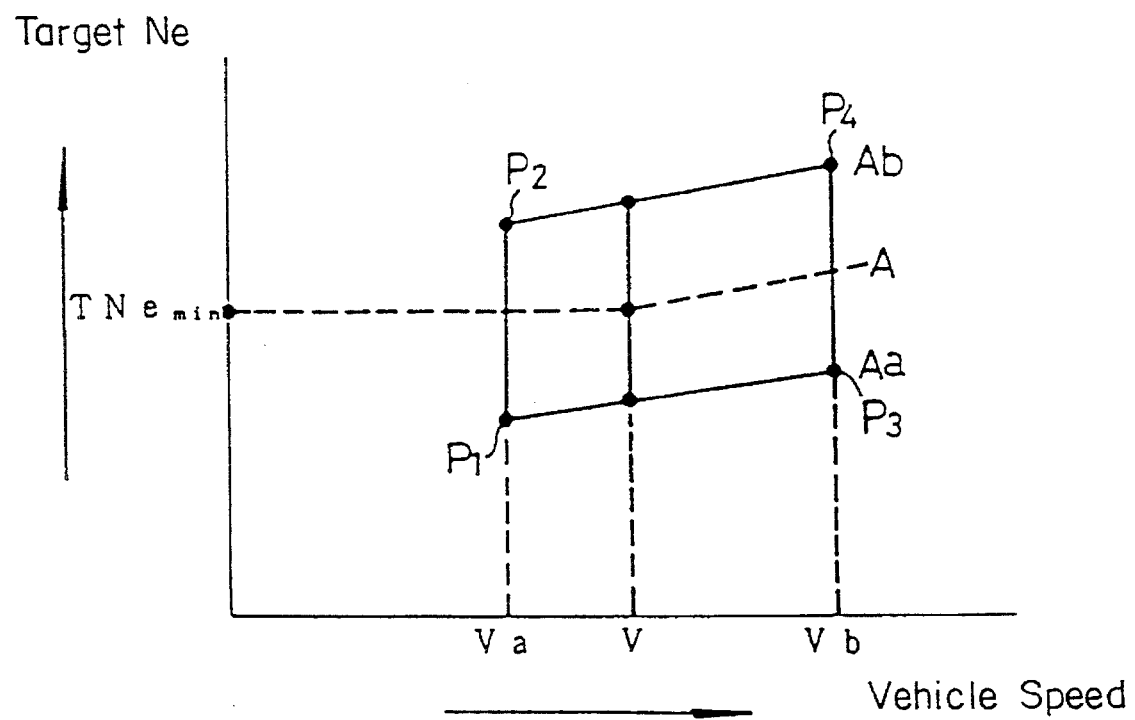
Figure 18:
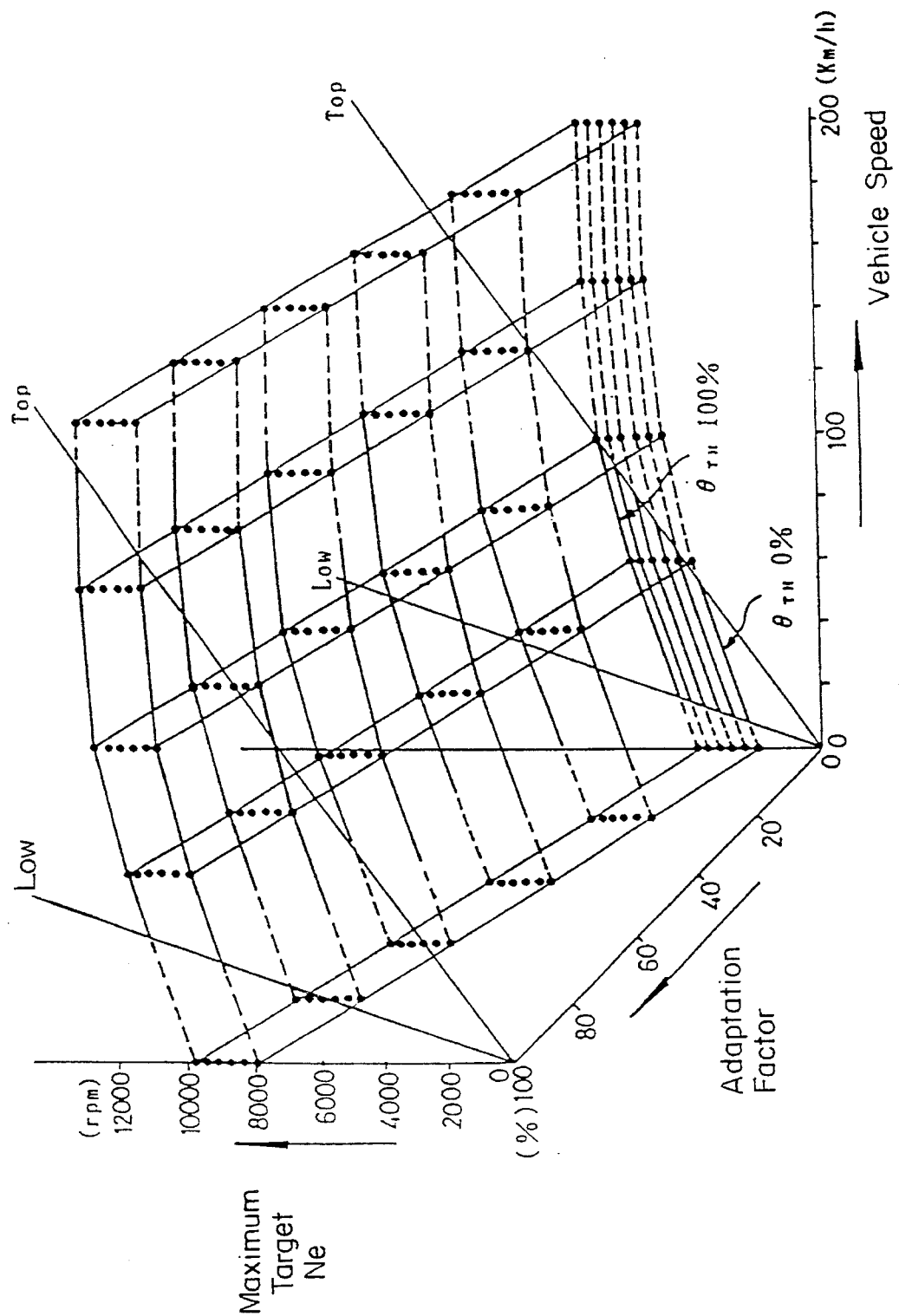
Figure 19:
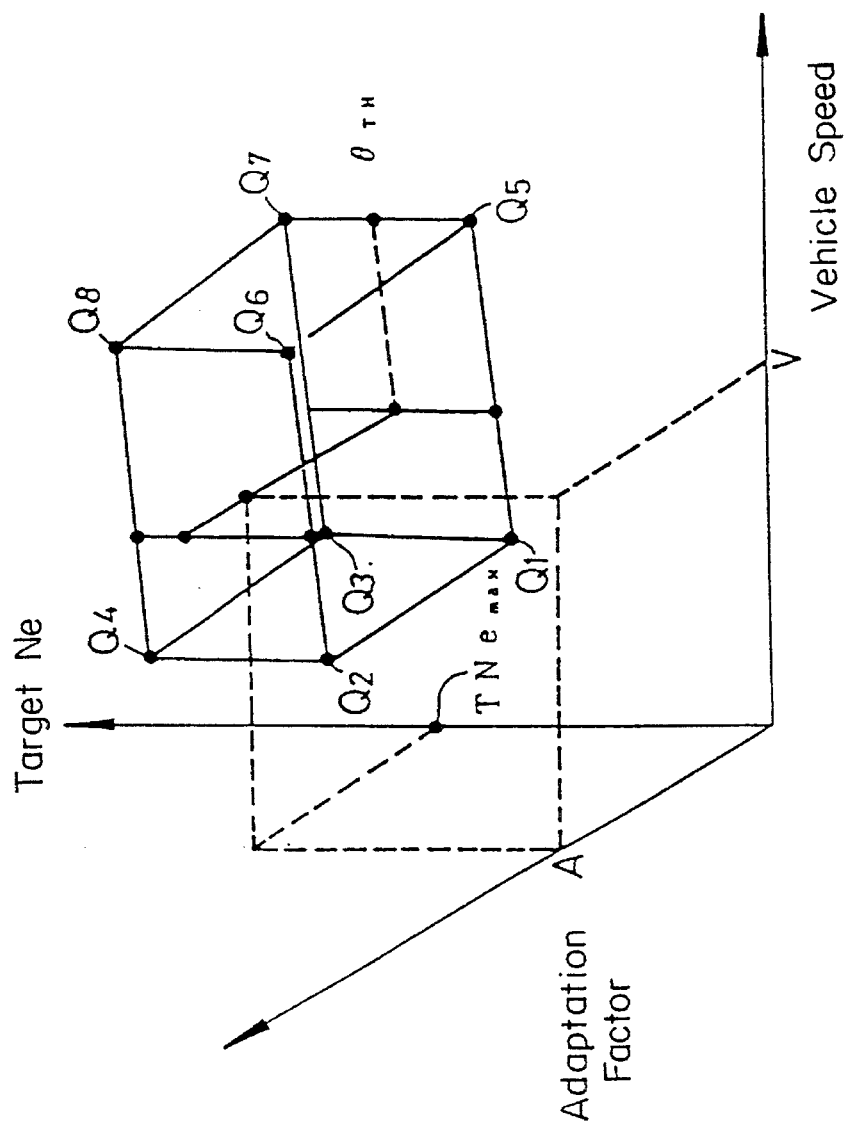
Figure 20:
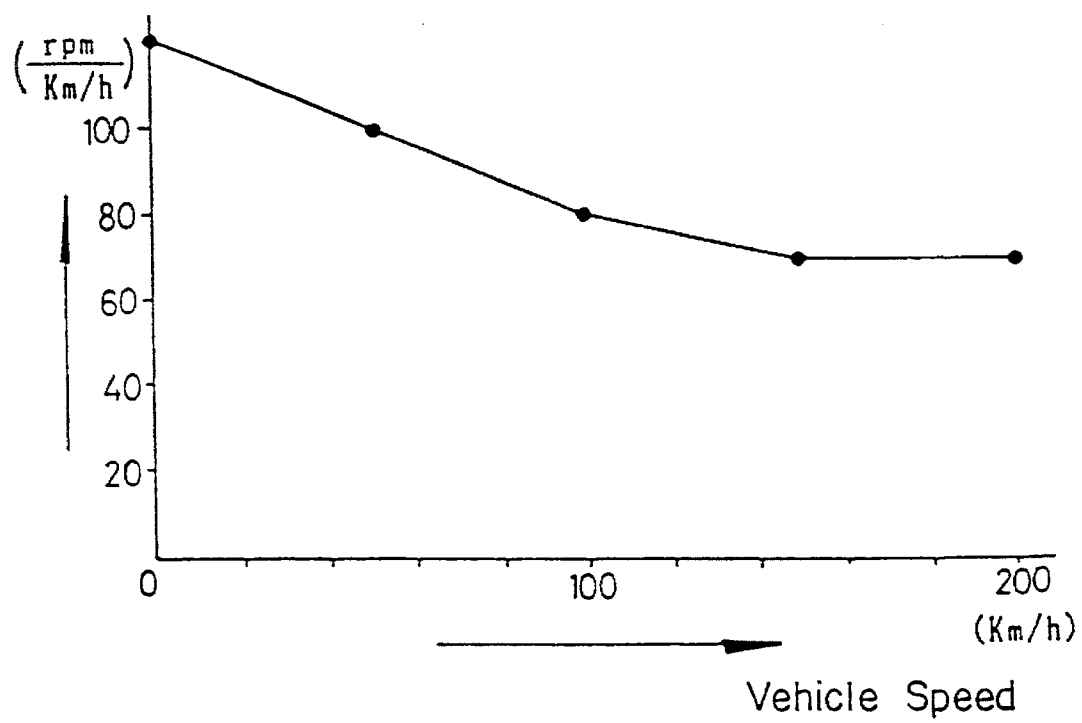
Figure 21:
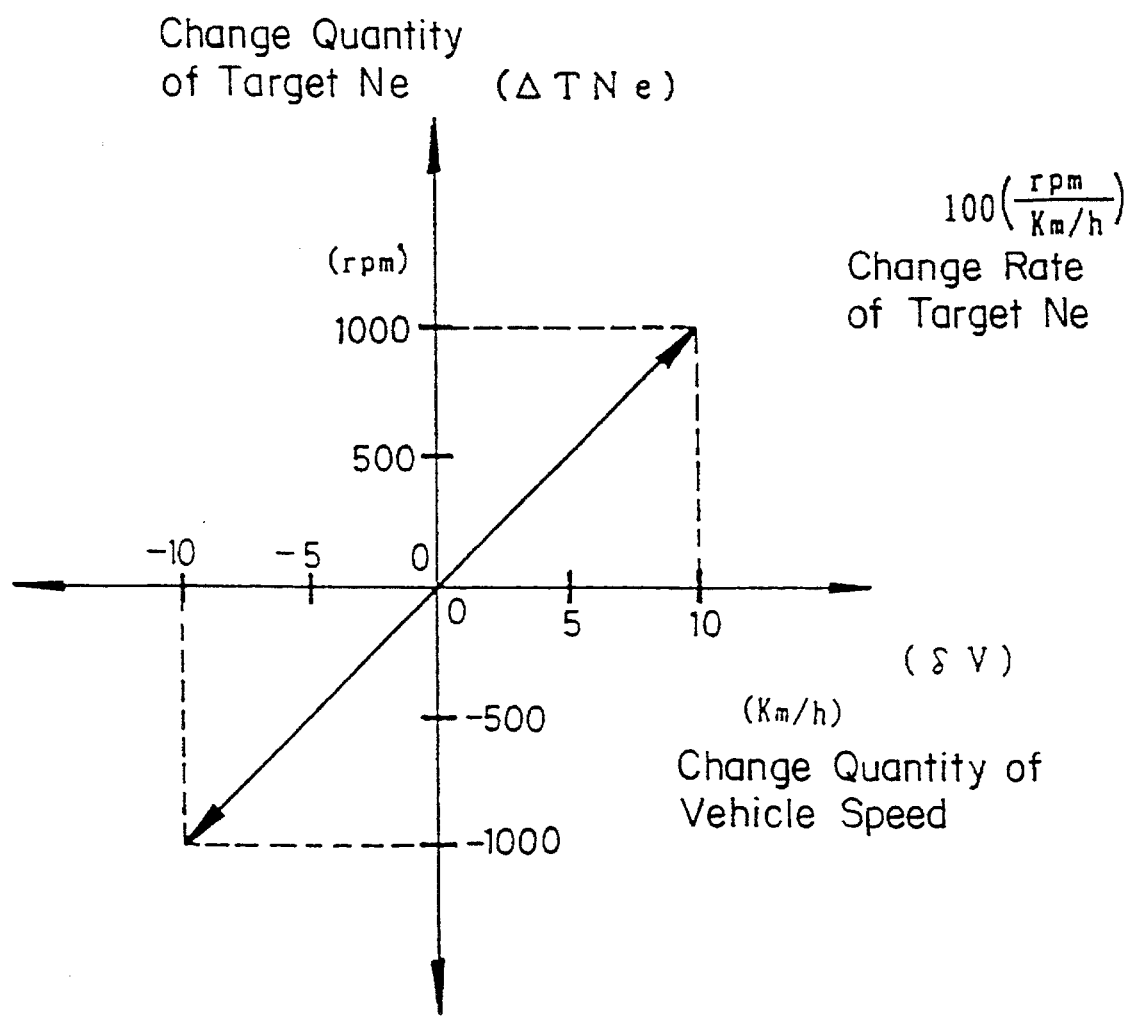
Figure 26:
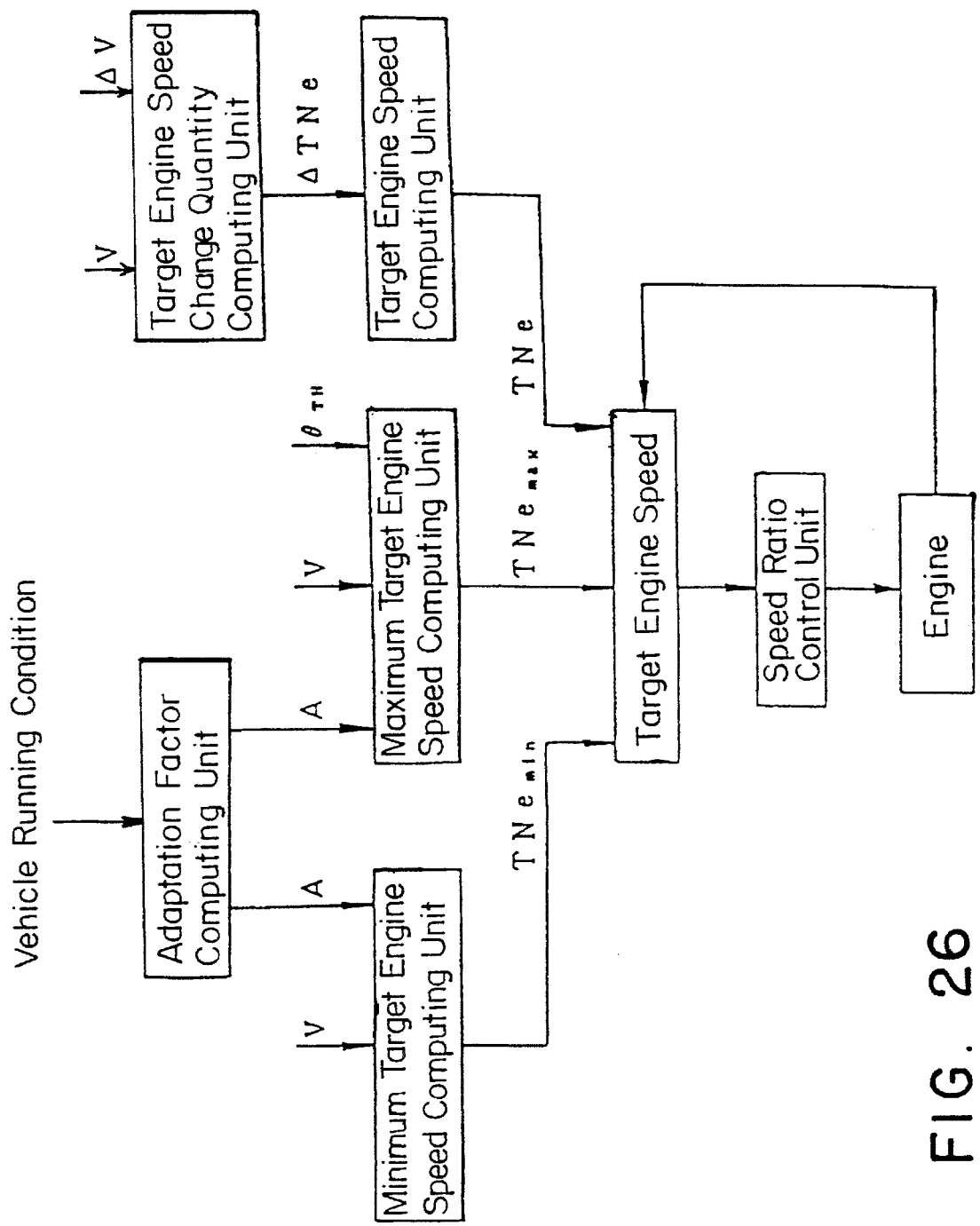
Figure 29:
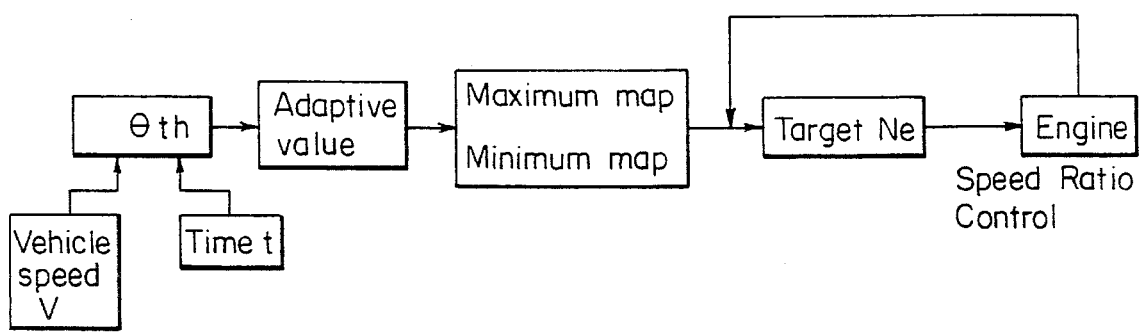

Jig. 2 is a flowchart of a first interrupt routine according to a first preferred embodiment of the present invention;

FIG. 3 is a flowchart of a second interrupt routine according to the first preferred embodiment;

FIG. 4 is a flowchart of a main routine according to the first preferred embodiment;

FIG. 5 is a map for obtaining a target engine speed from an average vehicle speed according to the first preferred embodiment;

FIG. 6 is a map similar to FIG. 5, according to a modification of the first preferred embodiment;

FIG. 7 is a flowchart of an adaptation factor computation subroutine according to another modification of the first preferred embodiment;

FIGS. 8(a)–8(c) are diagrammatic views illustrating an adaptation factor computed by the subroutine shown in FIG. 7;

FIG. 9 is a flowchart of a main routine according to a second preferred embodiment of the present invention;

FIG. 10 is a flowchart of an adaptation factor computation subroutine according to the second preferred embodiment;

FIG. 11(a) is a flowchart of a first interrupt routine according to the second preferred embodiment;

FIGS. 11(b) and 11(c) respectively illustrate a vehicle speed ring buffer and a vehicle acceleration ring buffer;

FIG. 12 is a flowchart of a second interrupt routine according to the second preferred embodiment;

FIG. 13 is a flowchart of a timer interrupt routine;

FIG. 14 is an increase rate table of an engine load component of an adaptation factor;

FIG. 15 is a decrease rate table of an engine load component of an adaptation factor;

FIG. 16 is a map for obtaining a minimum target engine speed from a vehicle speed and an adaptation factor;

FIG. 17 is an enlarged view of an essential part in FIG. 16;

FIG. 18 is a map for obtaining a maximum target engine speed from a vehicle speed, an adaptation factor, and an engine load;

FIG. 19 is an enlarged view of an essential part in FIG. 18;

FIG. 20 is a map for obtaining a target engine speed change rate from a vehicle speed;

FIG. 21 is a map for obtaining a target engine speed change quantity from a vehicle speed change quantity;

FIGS. 22(a)–22(d) are graphs illustrating the relation between an adaptation factor and a target engine speed;

FIGS. 23(a)–23(d) are diagrammatic views illustrating the operation in closing an accelerator;

FIGS. 24(a)–24(c) are diagrammatic views illustrating the operation in opening the accelerator;

FIGS. 25(a)–25(e) are diagrammatic views illustrating the operation in cruising and sport running;

FIG. 26 is a block diagram illustrating the operation of the second preferred embodiment;

FIG. 27 is a map for obtaining a running resistance from a vehicle speed and a drive wheel torque;

FIG. 28 is a map for obtaining an engine horsepower from an engine speed and an engine load; and FIG. 29 is a flowchart in obtaining a target engine speed from an adaptive value of an engine load.

DETAILED DESCRIPTION OF THE PREFERRED EMBODIMENTS

A first preferred embodiment of the present invention will now be described with reference to FIGS. 1 to 8.

Figure 1:
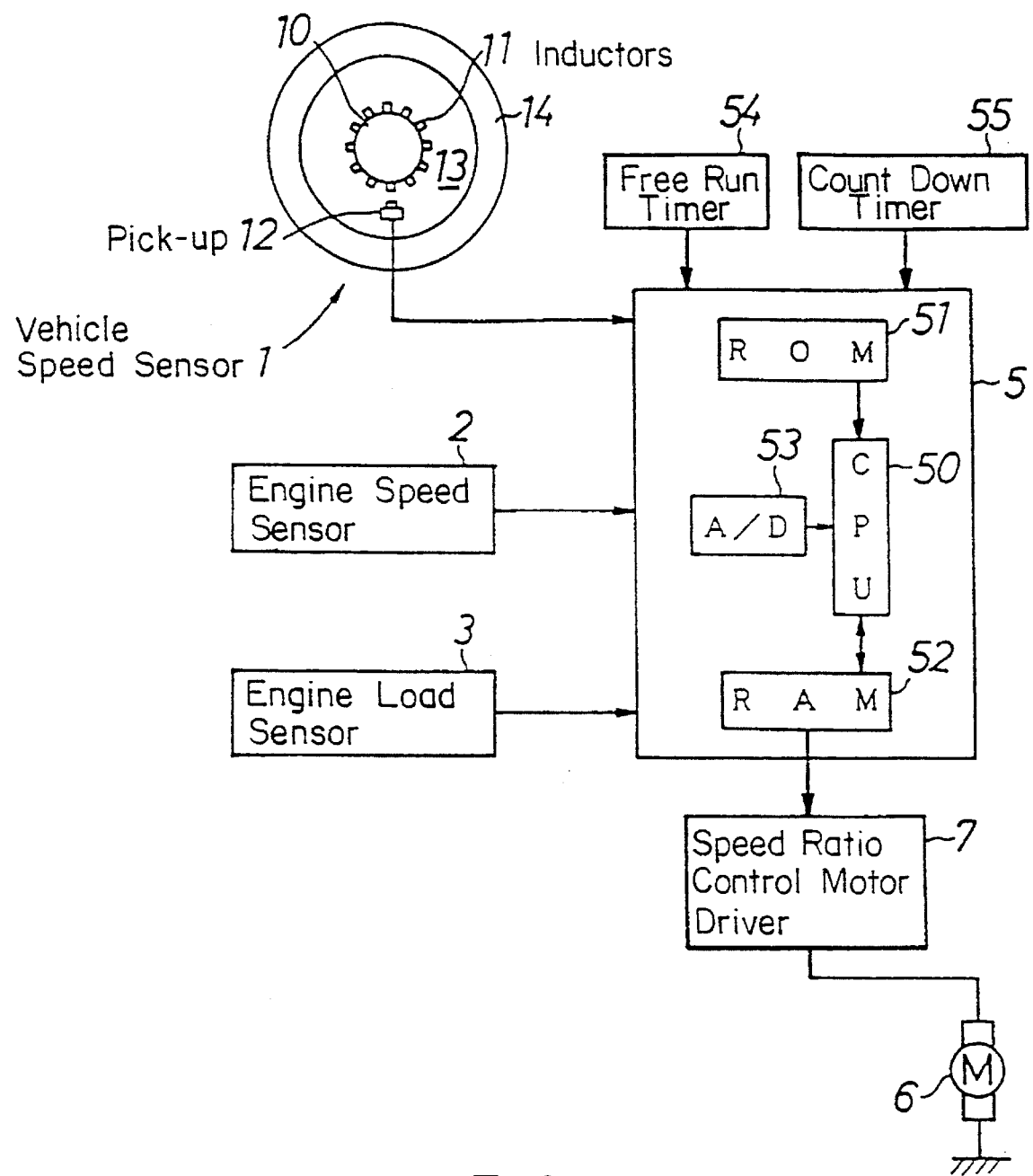
FIG. 1 is a block diagram of a control system according to the present invention.

As shown in FIG. 1, a control system of the present invention includes a vehicle speed sensor 1, an engine speed sensor 2, an engine load sensor 3, a microcomputer 5, a speed ratio control motor driver 7, and a speed ratio control motor 6. Detection outputs from the vehicle speed sensor 1, the engine speed sensor 2, and the engine load sensor 3 are supplied to the microcomputer 5. A control output from the microcomputer 5 is supplied to tho speed ratio control motor driver 7 to drive the speed ratio control motor 6, such as a servo motor, for varying a speed ratio.

The microcomputer 5 includes a central processing unit (CPU) 50, a ROM 51 storing a program and a plurality of target engine speed decision tables according to various speed ratio control methods or the like, a RAM 52 having a data area for temporarily storing detection data and a working area for carrying out computation or the like, etc., an A/D converter 53 for converting analog input detection data into digital data, and a free run timer 54 and a count down timer 55 for counting clock pulses to measure time. In FIG. 1, the free run timer 54 and the count down timer 55 are shown outside the microcomputer 5 for the sake of convenience. The down count down timer 55 is not used in the first preferred embodiment, but it is used in a second preferred embodiment to be hereinafter described.

The vehicle speed sensor 1 is constructed of a pulse generator 13 which comprises a plurality of inductors 11 projecting from an outer circumference of an axle 10 and a pickup 12 for detecting the passage of the inductors 11. Output pulses from the pulse generator 13 are supplied to the microcomputer 5. Reference numeral 14 denotes a tire. Similarly, the engine speed sensor 2 is constructed of a pulse generator which comprises a plurality of inductors projecting from an outer circumference of an engine crankshaft and a pickup for detecting passing of the inductors. Output pulses from the pulse generator are also supplied to the microcomputer 5.

The engine load sensor 3 may be constructed of a throttle valve opening sensor for detecting an opening degree of a throttle valve, a vacuum sensor for detecting an intake manifold vacuum, or an intake air quantity sensor. In this preferred embodiment, the throttle valve opening sensor is used as the engine load sensor 3, and a detection output from the throttle valve opening sensor is supplied as an engine load detection output to the microcomputer 5.

The operation of the first preferred embodiment mentioned above will now be described with reference to FIGS. 2 to 4 according to the program stored in the ROM 51.

Figure 2:
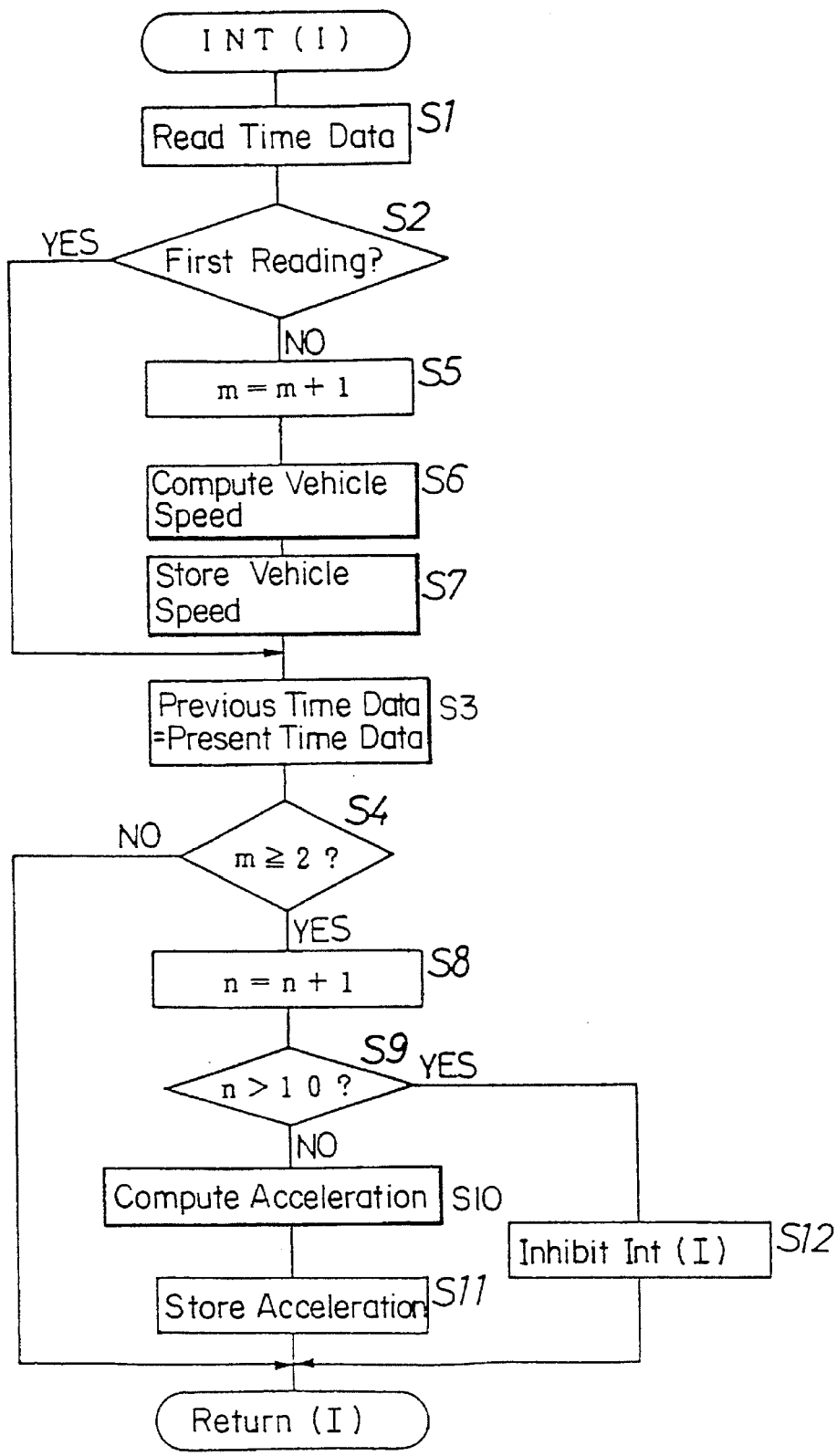

Every time a pulse is output from the vehicle speed sensor 1, a first interrupt routine shown in FIG. 2 is started. First, time data from the free run timer 54 is read (step S1), and it is then checked whether or not the input pulse is a first pulse read in the present cycle of this routine (step S2). If it is determined that the input pulse is the first pulse, or that m=1 wherein m is the input pulse number, time data read in the previous cycle of this routine is updated to the time data read in the present cycle of this routine (step S3). Then, it is checked whether m≧2 or not (step S4). If it is determined in step S4 that m<2, the program is returned. The reason why the program is returned if m<2 is that a vehicle speed to be hereinafter described is computed only once, and an acceleration cannot therefore be computed. Further, if m≧12, the value of m is reset to 0.

If it is determined in step S2 that the input pulse is not the first pulse, m is incremented by 1 (step S5). Then, a vehicle speed is computed as [constant/(present time data—previous time data)] (step S6), and the computed vehicle speed data V is stored into an address in the RAM 52 computed in step S5 (step S7).

Subsequent to step S7, the time data is updated (step S3), and it is then checked whether m≧2 or not (step S4). If it is determined in step S4 that m≧2, n is incremented by 1 (step S8), and it is then checked whether n>10 or not (step S9). If it is determined in step S9 that n≦10, an acceleration is computed as [constant(present vehicle speed previous vehicle speed)/(present time data—previous time data)] (step S10), and the computed acceleration data G is stored into an address in the RAM 52 computed in step S8 (step S11). Then, the program is returned. If it is determined in step S9 that n≦10, the first interrupt routine is inhibited (step S12).

On the other hand, every time a pulse is output from the engine speed sensor 2, a second interrupt routine shown in FIG. 3 is started. First, time data from the free run timer 54 is read (step S21), and it is then checked whether or not the input pulse is a first pulse read in the present cycle of this routine (step S22). If it is determined that the input pulse is the first pulse, or that k=1 wherein k is the input pulse number, time data read in the previous cycle of this routine is updated to the time data read in the present cycle of this routine (step S23). Then, it is checked whether k>5 or not (step S24). If it is determined in step S24 that k≧5, the program is returned.

If it is determined in step S22 that the input pulse is not the first pulse, k is incremented by 1 (step S25). Then, an engine speed is computed as [constant/(present time data—previous time data)] (step S26), and the computed engine speed data Ne is stored into an address in the RAM 52 computed in step S25 (step S27).

Subsequent to step S27, the time data is updated (step S23), and it is then checked whether k>5 or not (step S25). If it is determined in step S24 that k≧5, the program is returned. In contrast, if it is determined in step S24 that k>5, the second interrupt routine is inhibited (step S28).

Thus, the vehicle speed data V and the acceleration data G are computed and stored by the first interrupt routine, and the engine speed data Ne is computed and stored by the second interrupt routine.

A main routine will now be described with reference to FIG. 4.

Output data from the engine load sensor 3 is read into the microcomputer 5 (step S31); j, the number of input pulses, is incremented by 1 (step S32); and the engine load data read above is stored into an address in the RAM 52 computed in step S32 (step S33). Until a predetermined number of each data of the vehicle speed, the acceleration, and the engine speed is obtained, steps S31 to S33 are repeatedly executed (step S34). When j≧5, j is reset to 0. As a result, four engine load data θth are stored.

If it is determined in step S34 that eleven computed vehicle speed data V, ten computed acceleration data G, and five computed engine speed data Ne are obtained, the inhibition of the first and second interrupt routines are canceled (step S35).

Subsequent to step S35, in order to correct a variation in accuracy, an average vehicle speed Vm is computed as follows:

$$Vm=(|V_1|+|V_2|+ \ldots +|V_{11}|)/22$$

and an average vehicle speed change quantity ΔVs is then computed as follows (step S36):

$$\Delta Vs=(|\Delta V_1|+|\Delta V_2|+ \ldots +|\Delta V_{10}|)/10$$

where $\Delta V=V_i-V_{i-1}$.

Instead of the average vehicle speed change quantity ΔVs, an average acceleration Gs may be computed as follows:

$$Gs=(|G_1|+|G_2|+ \ldots +|G_{10}|)/10$$

In this preferred embodiment, the average vehicle speed change quantity ΔVs is used. Accordingly, the steps of acceleration computation and storage shown in FIG. 2 may be omitted.

When the average vehicle speed change quantity ΔVs is frequently large in the positive and negative directions, a running mode is regarded as a sport mode where acceleration and deceleration are frequently repeated. On the other hand, when the average vehicle speed change quantity ΔVs is approximately to 0, the running mode is regarded as a cruising mode where a vehicle runs at a substantially constant speed. The average vehicle speed change quantity may be replaced by an average acceleration by computing accelerations from elapsed time and vehicle speed change quantities.

Subsequent to step S36, in order to remove a variation in accuracy, an average engine speed Nes is computed as follows (step S37):

$$Nes=(Ne_1+Ne_2+Ne_3+Ne_4+Ne_5)/5$$

Subsequent to step S37, an average engine load θ ths is similarly computed as follows (step S38):

$$\theta ths=(\theta th_1+\theta th_2+\theta th_3+\theta th_4)/4$$

When the average engine load θths is large, the running mode is regarded as a sport mode or uphill running, while when the average engine load θ ths is approximate to 0, the running mode is regarded as a cruising mode.

The number of times that acceleration is detected is preferably selected to be larger than the number of times that engine load is detected. This is due to the following reasons. The acceleration is always finely fluctuated by the influences of unevenness of a road surface, rotation fluctuation of the engine, and backlash of a drive system. To remove the above influences and determine the acceleration and deceleration of the vehicle, it is necessary to average the accelerations in a time interval of several seconds. Further, to determine whether large acceleration and deceleration are repeated in the sport mode, it is necessary to average the accelerations in a time interval of tens of seconds. The reason why the time interval of tens of seconds is required is that the sport mode cannot be determined by averaging the accelerations in the time interval of several seconds because braking for several seconds or accelerating even in slow running may be carried out. Accordingly, to determine the running mode from a change in vehicle speed, it is necessary to observe the accelerations in the time interval of tens of seconds.

On the other hand, the running mode can be instantaneously determined from an engine load. For example, when the throttle valve opens near to a full opening, the running mode can be instantaneously determined as the sport mode. That is, during slow running, there is almost no possibility that the throttle valve may open near to the full opening. Thus, the determination of the running mode from the engine load can be effected in a short time interval from observation.

Subsequent to step S38, an adaptation factor A is computed as follows (step S39):

$$A = aC_1 + bC_2$$

where a and b represent constants; $C_1$ represents an engine load component of the adaptation factor A; and $C_2$ represents a vehicle body change quantity component of the adaptation factor A.

In the first preferred embodiment, the engine load component $C_1$ of the adaptation factor A is defined as the average engine load θths obtained in step S38, and the vehicle body change quantity component $C_2$ of the adaptation factor A is defined as the average vehicle speed change quantity ΔVs obtained in step S36. Accordingly, the adaptation factor A in the first preferred embodiment is expressed as follows:

$$A = a\theta ths + b\Delta Vs$$

In many cases, a driver's demand to drive fast with a high engine output must be met in a short time, and a driver's demand to drive slowly with a low engine output is sufficiently met in a relatively long time. Therefore, in computing the adaptation factor A, the constant a is set so that a rate of change with respect to time may be increased in the case of increasing the adaptation factor A, and the constant b is set so that a rate of change with respect to time may be decreased in the case of decreasing the adaptation factor A.

Subsequent to step S39, a first table of average vehicle speed Vm–target engine speed Ne stored in the ROM 51 is retrieved according to a speed ratio control method. An example of the first table retrieved is shown by a solid line in FIG. 5. The first table thus retrieved is referred to, and a first target engine speed Nea corresponding to an average vehicle speed Vm is retrieved (step S40).

Subsequent to step S40, a second table of average vehicle speed Vm–target engine speed Ne stored in the ROM 51 is retrieved. The target engine speed Ne in the second table is higher than that in the first table. An example of the second table retrieved is shown by a broken line in FIG. 5. The second table thus retrieved is referred to, and a second target engine speed Neb corresponding to an average vehicle speed Vm is retrieved (step S41).

Subsequent to step S41, an interval between the first target engine speed Nea and the second target engine speed Neb is interpolated according to the adaptation factor A to obtain a final target engine speed Nec (step S42).

Subsequent to step S42, a control signal based on proportional control is supplied to the speed ratio control motor driver 7 to control a speed ratio by the speed ratio control motor 6 so that the average engine speed Nes may become the final target engine speed Nec as a target value (step S43). The proportional control may be replaced by (proportional+integral) control or (proportional+integral+derivative) control.

Thus, the adaptation factor A as an element for deciding the target engine speed Nec is decided according to both the average engine load θths and the average vehicle speed change quantity ΔVs rather than according to only the average engine load θths. Accordingly, it is possible to prevent a situation wherein fluctuation in engine load Θth has a direct influence on a speed ratio of a continuously variable transmission and damage a feeling of vehicle performance.

Furthermore, since the target engine speed Nec is automatically increased or decreased according to the adaptation factor A, it is unnecessary for a driver to operate a mode select switch, and either an economy mode suitable for cruising or a sport mode where acceleration and deceleration are repeated can be automatically selected. Accordingly, the driver is released from troublesome switch selecting operation for mode selection, and a sense of inadaptiveness of the continuously variable transmission as felt by the driver can be eliminated when the manual mode selection is avoided.

A first modification of the first preferred embodiment will now be described.

As shown in FIG. 6, a table of average vehicle speed Vm–target engine speed Ne including an adaptation factor as a parameter is previously stored in the ROM 51 according to a speed ratio control method.

Accordingly, in the first modification, the table shown in FIG. 6 is retrieved from the ROM 51 in step S40 according to the speed ratio control method. Since the adaptation factor is included in the table thus retrieved, the target engine speed Nec can be obtained from the average vehicle speed and the adaptation factor in the table shown in FIG. 6. As a result, step S41 may be skipped in the first modification.

A second modification of the first preferred embodiment will now be described.

In the second modification, the adaptation factor is computed in consideration of a time element.

Assuming that an adaptation factor $A=A_1$ computed in executing the previous cycle of the main routine shown in FIG. 4 is changed into an adaptation factor A=A' to be computed in executing the present cycle of the main routine, the adaptation factor A' is computed as $A'=ct=A_1$ where t represents a time interval between the execution of the previous cycle and the execution of the present cycle.

In the second modification, the computation of the adaptation factor in step S39 is shown in FIG. 7. When the program enters the step of the computation of the adaptation factor, time data is read from the free run timer 54 (step S391); the difference t between the present time data and the previous time data is computed (step S392); and the previous time data is updated to the present time data (step S393).

Subsequent to step S393, the adaptation factor A is computed as A=aθths+bΔVs (step S394), and it is then checked whether $A \geq A_1$ or not (step S395). If it is determined in step S395 that $A \geq A_1$, the adaptation factor A' is computed as $A'=ct+A_1$ where c represents a positive integer (step S396).

Subsequent to step S396, it is checked whether A>A' or not (step S397). If it is determined in step S397 that A>A', $A_1$ is updated to A' (step S398) If it is determined in step S397 that A≦A' A is replaced by A' (step S399), and step S398 is then executed.

Accordingly, as shown in FIG. 8(b), the adaptation factor A linearly increases with time until A' becomes equal to $A_2$ by the execution of steps S396 to S399.

If it is determined in step S395 that $A<A_1$, the adaptation factor A' is computed as $A'=dt+A_1$ where d represents a negative integer (step S400).

Then, it is checked whether A>A' or not (step S401). If it is determined in step S401 that A>A', step S398 is executed. If it is determined in step S401 that A≦A' step S399 is executed Accordingly, as shown in FIG. 8(b), the adaptation factor A linearly decreased with time until A' becomes equal to $A_1$ by the execution of steps S400, S401, S398, and S399.

Thus, the adaptation factor A computed by the steps shown in FIG. 7 changes linearly with time as shown in FIG. 8(b). Alternatively, the adaptation factor A may change exponentially rather than linearly with time as shown in FIG. 8(c).

A second preferred embodiment of the present invention will now be described with reference to FIGS. 9 to 26. The second preferred embodiment is schematically shown in a block diagram of FIG. 26. A general construction of a control system in the second preferred embodiment is the same as that in the first preferred embodiment shown in FIG. 1.

Referring to FIG. 9 which shows a flowchart of a main routine, the system is first initialized in step S1. Then, an engine load θth is read in step S2, and an adaptation factor A is computed in step S3 according to data including the engine load θth. Then, it is checked in step S4 whether or not each parameter has reached a predetermined number. The loop of steps S2 to S4 is repeated until a ring buffer for vehicle speed V and a ring buffer for vehicle acceleration G (see FIGS. 11(b) and (c)) are filled with data in a first interrupt routine to be hereinafter described.

The first interrupt routine will now be described with reference to the flowchart shown in FIG. 11(a).

Every time a pulse is output from the vehicle speed sensor 1, the execution of the main routine is interrupted to start the first interrupt routine. In step S31, an output from the free run timer 54 is read.

To detect a vehicle speed, it is necessary to know a time interval between two continuous pulses. Assuming that a pulse first detected after application of power to the system is a pulse m=0, a vehicle speed can be computed upon detecting a pulse m=1 next to the pulse m=0. That is, when m=1 is determined in step S32 to detect two continuous pulses (i.e., pulse m=0 and pulse m=1), m is incremented by 1 in step S33. Then in step S34, a vehicle speed is computed by dividing a constant proportional to a tire diameter by a time interval between the two pulses. Then in step S35, the vehicle speed thus computed is stored as a vehicle speed $V_0$ into a first address in a Vn ring buffer, illustrated in FIG. 11(b). In this manner, vehicle speeds computed in the repeated loops of this routine are sequentially stored as vehicle speeds $V_0$ to $V_9$ into ten addresses in the Vn ring buffer.

To compute a vehicle acceleration, it is necessary to know two continuous vehicle speeds and a time interval between times of computation of the vehicle speeds, and it is therefore necessary to know three pulses. When m=2 is determined in step S36 to detect three pulses (i.e., pulse m=0, pulse m=1, and pulse m=2), two vehicle speeds ($V_0$ and $V_1$) are stored into the Vn ring buffer. Accordingly, in step S37, a vehicle acceleration is computed by dividing the difference between the vehicle speed $V_1$ and the vehicle speed $V_0$ by the time interval between the two pulses (pulse m=1 and pulse m=2). Then in step S38, the vehicle acceleration thus computed is stored as a vehicle acceleration $G_0$ into a first address in a Gn ring buffer, illustrated in FIG. 11(c). In this manner, vehicle accelerations computed in the repeated loops of this routine are sequentially stored as vehicle accelerations $G_0$ to $G_9$ into ten addresses in the Gn ring buffer.

In step S39, n is incremented one by one every time the loop is executed. When n reaches 10 in step S40 to fill the Vn ring buffer with the vehicle speeds $V_0$ to $V_9$ and fill the Gn ring buffer with the vehicle accelerations $G_0$ to $G_9$, n is reset to 0 in step S41, and the previous time data is replaced by the present time data in step S42.

A second interrupt routine will now be described with reference to the flowchart shown in FIG. 12.

Every time a pulse is output from the engine speed sensor 2 with the rotation of the crankshaft, the execution of the main routine is interrupted to start the second interrupt routine. In step S51, an output from the free run timer 54 is read.

To detect an engine speed, it is necessary to know a time interval between two continuous pulses. Assuming that a pulse first detected after application of power to the system is a pulse j=0, an engine speed can be computed upon detecting a pulse j=1 next to the pulse j=0. That is, when j=1 is determined in step S52 to detect two continuous pulses (i.e., pulse j=0 and pulse j=1), j is incremented by 1 in step S53. Then in step S54, an engine speed is computed from a time interval between the two pulses. Then in step S55, the previous time data is replaced by the present time data.

When each ring buffer is filled with data in step S4 of the main routine shown in FIG. 9, the reading of an engine load θth and the computation of an adaptation factor A are executed again in step S5 and step S6, respectively.

An adaptation factor computation routine will now be described with reference to the flowchart shown in FIG. 10.

First, an engine load component $C_1$ of an adaptation factor A to be obtained in steps S79 to S84 appearing later is compared with the present engine load θth. If the driver operates an accelerator in an opening direction thereof to thereby make the present engine load θth greater than the engine load component $C_1$ of the adaptation factor A (step S71: Yes), the difference θth–$C_1$ between the present engine load θth and the engine load component $C_1$ is computed (step S72). Then, an increase rate +$dC_1$/dt is retrieved from an increase rate table (see FIG. 14) stored in the ROM 51 according to the difference θth–$C_1$ computed in step S72 (step S73). At this time, two-point interpolation is carried out to smooth a change in the increase rate +$dC_1$/dt. Then, a decrease rate –$dC_1$/dt of the engine load component $C_1$ is set to 0 (step S74).

As apparent from FIG. 14, when the difference θth–$C_1$ is small, that is, when an opening degree of the accelerator is small, the increase rate +$dC_1$/dt of the engine component $C_1$ is equal to 0 or a very small value. The larger the difference θth–$C_1$, the larger the increase rate +$dC_1$/dt.

On the other hand, if the driver operates the accelerator in a closing direction thereof to thereby make the present engine load θth equal to or less than the engine load component $C_1$ of the adaptation factor A (step S71: No), a decrease rate –$dC_1$/dt of the engine load component $C_1$ is retrieved from a decrease rate table (see FIG. 15) stored in the ROM 51 (step S75). Then, an increase rate +$dC_1$/dt of the engine load component $C_1$ is set to 0 (step S76).

As apparent from FIG. 15, the decrease rate –$dC_1$/dt of the engine load component $C_1$ is retrieved by four-point interpolation according to the present engine load θth and the adaptation factor A. The larger the adaptation factor A and the engine load θth, the larger the decrease rate –$dC_1$/dt of the engine load component $C_1$. An absolute value of the decrease rate –$dC_1$/dt is set to be smaller than an absolute value of the increase rate +$dC_1$/dt. The axis of abscissa in the table shown in FIG. 15 may represent a speed ratio of the continuously variable transmission instead of the adaptation factor.

Subsequent to step S74 or S76 in FIG. 10, it is determined in step S77 whether or not a 10 m flag is set at "1". The 10 m flag is a flag to be set according to an output from the count down timer 55 shown in FIG. 1. Referring to the flowchart shown in FIG. 13, when a preset time (e.g. 10 msec) has elapsed to once stop the count down timer 55, the 10 m flag is set to "1" in step S61. Then, the preset time of 10 msec is newly set in step S62, and the count down timer 55 is restarted to count down the preset time in step S63. The first start of the count down timer 55 after application of power to the system is carried out upon data initialization at starting of the main routine.

Referring back to FIG. 10, when the 10 m flag is set to "1" in step S77, the 10 m flag is then reset to "0" in step S78, and an engine load component-change quantity $\Delta C_1$ is computed in step S79. The engine load component change quantity $\Delta C_1$ is a total change quantity of the engine load component $C_1$ over the time interval of 10 msec, which is computed as follows:

$$\Delta C_1 = (\text{increase rate} - \text{decrease rate}) \times 10 \text{ msec}$$

Then, the engine load component change quantity $\Delta C_1$ thus computed is added to the present engine load component $C_1$, and the previous engine load component $C_1$ is updated to the sum $C_1 + \Delta C_1$ (step S80).

The reason why the time interval of 10 msec is used for the computation of the engine load component change quantity $\Delta C_1$ is that a cycle time of 3 to 6 msec is required for the execution of the main routine in one cycle with use of an 8-bit microcomputer. That is, the computation of the engine load component change quantity $\Delta C_1$ is to be carried out after ending of one cycle or more of the main routine.

Subsequent to step S80, a limit check for the engine load component $C_1$ computed above is carried out in steps S81 to S84. In the limit check, if the engine load component $C_1$ is greater than 100%, it is set to 100%. Furthermore, if the engine load component $C_1$ is less than 0%, it is set to 0%.

Then, an average Gs of absolute values of the vehicle accelerations $G_0$ to $G_9$ stored in the Gn ring buffer is computed as a vehicle body change quantity component $C_2$ of the adaptation factor A (step S85), and the adaptation factor A is then computed according to the vehicle body change quantity component $C_2$ and the engine load component $C_1$ (step S86).

After the computation of the adaptation factor A is carried out in step S6, a minimum target engine speed $TNe_{min}$ is obtained in step S7 according to a map shown in FIG. 16. That is, the minimum target engine speed $TNe_{min}$ is retrieved from the map shown in FIG. 16 according to the vehicle speed V and the adaptation factor A. In more detail, as referring to FIG. 17, two different values Va and Vb just lower and just higher than the vehicle speed V and two different values Aa and Ab just lower and just higher than the adaptation factor A are retrieved to obtain four intersections $P_1$ to $P_4$, and linear interpolation of the four intersections $P_1$ to $P_4$, is performed to thereby decide the minimum target engine speed.

Subsequent to step S7, a maximum target engine speed is obtained in step S8 according to a map shown in FIG. 18. That is, the maximum target engine speed $TNe_{max}$ is retrieved from the map shown in FIG. 18 according to the vehicle speed V, the adaptation factor A, and the average engine load θths. In more detail, as referring to FIG. 19, two different values just lower and just higher than the vehicle speed V, two different values just lower and just higher than the adaptation factor A, and two different values just lower and just higher than the average engine load θths are retrieved to obtain eight intersections $Q_1$ to $Q_8$, and linear interpolation of the eight intersections $Q_1$ to $Q_8$ is performed to thereby decide the maximum target engine speed.

Subsequent to step S8, a target engine speed change rate is obtained in step S9 according to a map shown in FIG. 20. That is, the target engine speed change rate (i.e., the rate of a target engine speed change quantity to a vehicle speed change quantity) is retrieved from the map shown in FIG. 20 according to the vehicle speed V.

Subsequent to step S9, a vehicle speed change quantity δV is computed in step S10 by subtracting the present value of the vehicle speed V from the previous value of the vehicle speed V. Then in step S11, the previous value of the vehicle speed V is updated to the present value of the vehicle speed V. Then in step S12, a target engine speed change quantity ΔTNe is computed by multiplying the vehicle speed change quantity δV by the target engine speed change rate obtained in step S9 (see FIG. 21).

After the decision of the target engine speed change quantity ΔTNe as mentioned above, a target engine speed TNe is decided in step S13 from the target engine speed change quantity ΔTNe in the following manner. An initial value of the target engine speed TNe is set to a minimum target engine speed $TNe_{min}$ corresponding to the vehicle speed V=0, and the present target engine speed TNe is decided by adding the target engine speed change quantity ΔTNe obtained in step S12 to the previous target engine speed TNe.

Then, it is checked in step S14 whether or not the target engine speed TNe is greater than the maximum target engine speed $TNe_{max}$ obtained in step S8. If the target engine speed TNe is greater than the maximum target engine speed $TNe_{max}$, the maximum target engine speed $TNe_{max}$ is set to the target engine speed TNe in step S15. Then, it is checked in step S16 whether or not the target engine speed TNe is less than the minimum target engine speed $TNe_{min}$ obtained in step S7. If the target engine speed TNe is less than the minimum target engine speed $TNe_{min}$, the minimum target engine speed $TNe_{min}$ is set to the target engine speed TNe.

Then in step S18, a speed ratio of the continuously variable transmission as an operation quantity is controlled by driving the speed ratio control motor 6 through the speed ratio control motor driver 7 so that the engine speed Ne as a control quantity may accord with the target engine speed TNe as a target value decided above. When the speed ratio reaches Low or Top during the course of control, the operation of the speed ratio control motor 6 is stopped.

A more specific description in relation to the above will be given with reference to FIGS. 22(a)–(d). In the following description, the vehicle body change quantity component $C_2$ of the adaptation factor A is set to 0 for convenience and ease of understanding.

When the driver operates the accelerator to increase the engine load θth as shown in FIG. 22(a), there occurs a change in the minimum target engine speed $TNe_{min}$, as in FIG. 22(d), is obtained from the adaptation factor A (equivalent to the engine load component $C_1$, as in FIG. 22(b), in this case because the vehicle body change quantity component $C_2$ is set to 0) and the vehicle speed V as in FIG. 22(c). Further, there also occurs a change in the maximum target engine speed $TNe_{max}$ obtained from the adaptation factor A, the vehicle speed V, and the average engine load θths. Accordingly, the target engine speed TNe changes as shown by a broken line in FIG. 22(d) between the minimum target engine speed $TNe_{min}$ and the maximum target engine speed $TNe_{max}$ according to the target engine speed change quantity ΔTNe obtained from the vehicle speed V and the vehicle speed change quantity δV. In the case where the vehicle body change quantity component $C_2$ is not 0, the adaptation factor A increases by a quantity corresponding to the vehicle body change quantity component $C_2$, and the target engine speed TNe is accordingly shifted to a somewhat higher value.

According to the second preferred embodiment mentioned above, the following effect can be obtained.

Even when the throttle opening θth is changed by the accelerator operation by the driver, the speed ratio of the continuously variable transmission can be kept almost constant to effect smooth running. In the condition where θth is kept almost constant as in cruising, $C_2$ is 0, and $C_1$ is maintained at the same value as θth to result in that the adaptation factor A is constant. When the engine load θth is slightly shifted in the increasing direction from this condition, the increase rate $+dC_1/dt$ of $C_1$ is generated according to the difference between θth and $C_1$. As apparent from the increase rate table shown in FIG. 14, however, when the difference between θth and $C_1$ is small, the increase rate $+dC_1/dt$ is small, so that the adaptation factor A hardly increases. On the other hand, when the engine load θth is slightly shifted in the decreasing direction, the decrease rate $-dC_1/dt$ is small, so that the adaptation factor A hardly decreases because the adaptation factor A during cruising is generally kept in a relatively small range of 50% or less, and the values in the decrease rate table shown in FIG. 15 are set lower than the values in the increase rate table.

Accordingly, even when the engine load θth is changed by small variations of the accelerator opening during cruising, the adaptation factor A can be kept almost constant. Furthermore, since the vehicle speed during cruising is also almost constant, the target engine speed TNe depending on the adaptation factor A and a function of the vehicle speed is also kept almost constant. As a result, smooth running at a constant speed can be effected.

When the accelerator is once turned off during cruising and is then turned on, the engine load θth rapidly decreases down to 0%, and then rapidly increases. In the decrease rate table shown in FIG. 15, however, the decrease rate $-dC_1/dt$ is almost zero for θth=0% in the range of the adaptation factor A<50% Therefore, even when the accelerator is once turned off and then turned on during cruising, the adaptation factor A can be kept almost constant, and the target engine speed TNe can accordingly be kept constant to thereby effect smooth running at a constant speed.

Further, according to the second preferred embodiment, when the engine load θth is decreased from a large value, the following effect can be obtained. In general, the by decreasing the engine load 8 th from a large value one expects to obtain a strong engine brake braking effect. However, in the case of entrance into an expressway, for example, the transition from an accelerating condition to a cruising condition is only desired, but no engine brake is desired. In other words, when the engine load θth is decreased to 0% after the accelerating condition, a strong engine brake is obtained. In contrast, when the engine load e th is decreased to a cruising opening after the accelerating condition, an engine brake is not obtained, but the cruising condition is obtained.

Figure 23A:
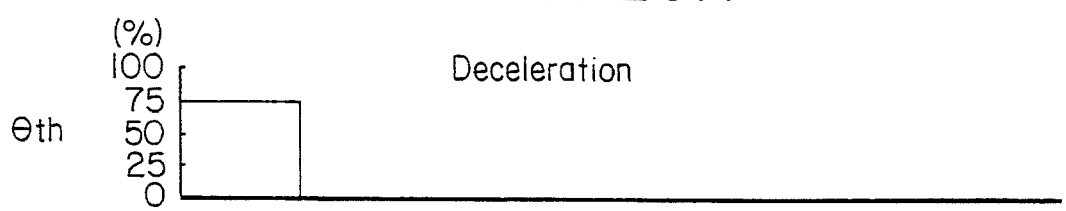
Figure 23B:
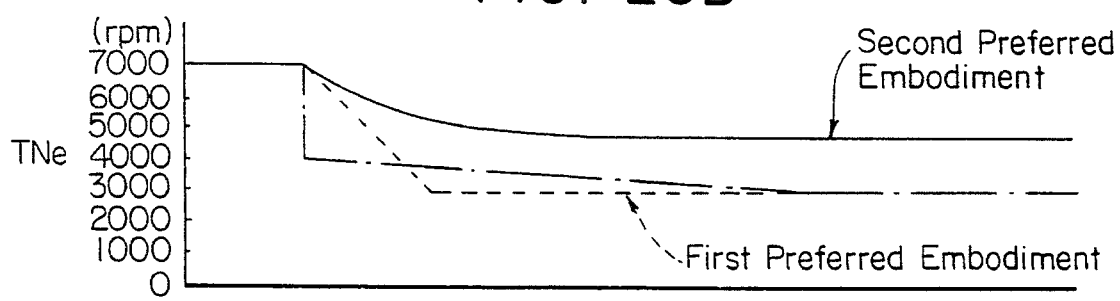

Referring to FIGS. 23(a) and 23(b), there are shown changes in the engine load θth and the target engine speed TNe in decelerating the vehicle from the accelerating condition by effecting the engine brake. As shown in FIG. 23(a), the engine load θth rapidly decreases from 75% to 0%, for example. As apparent from the characteristic of θth=0% in the decrease rate table shown in FIG. 15, the decrease rate $-dC_1/dt$ in the low range of the adaptation factor A is set at 0, and the adaptation factor A therefore hardly decreases. As a result, as apparent from the characteristic of the second preferred embodiment shown by a solid line in FIG. 23(b), the target engine speed TNe is maintained at a high value, thereby generating strong engine braking due to the high engine speed.

The characteristic shown by a broken line in FIG. 23(b) corresponds to the first preferred embodiment wherein the engine load component $C_1$ of the adaptation factor A is defined as the average engine load θths. Because of a delay of time (e.g., 2 sec) required for computing the average engine load θ ths from the engine load θth, a decrease in the target engine speed TNe is delayed in timing from a decrease in the engine load θth. As a result, just after the accelerator is turned off, a relatively strong engine brake can be obtained. Thus, the engine brake characteristic in the first preferred embodiment can be improved effectively next to that in the second preferred embodiment.

The characteristic shown by a dot and dash line in FIG. 23(b) corresponds to the conventional system mentioned above (Japanese Patent Laid-open Publication No. 62-12430) wherein the target engine speed TNe is obtained directly from the engine load θth. In this case, the target engine speed TNe rapidly decreases simultaneously with a decrease in the engine load θth. As a result, a strong engine brake cannot be obtained at the moment of turning off the accelerator.

Figure 23C:
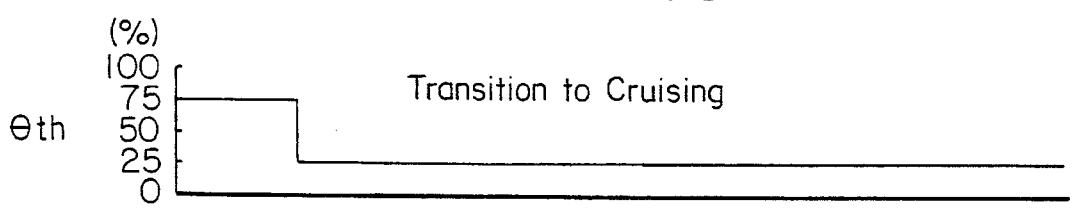
Figure 23D:
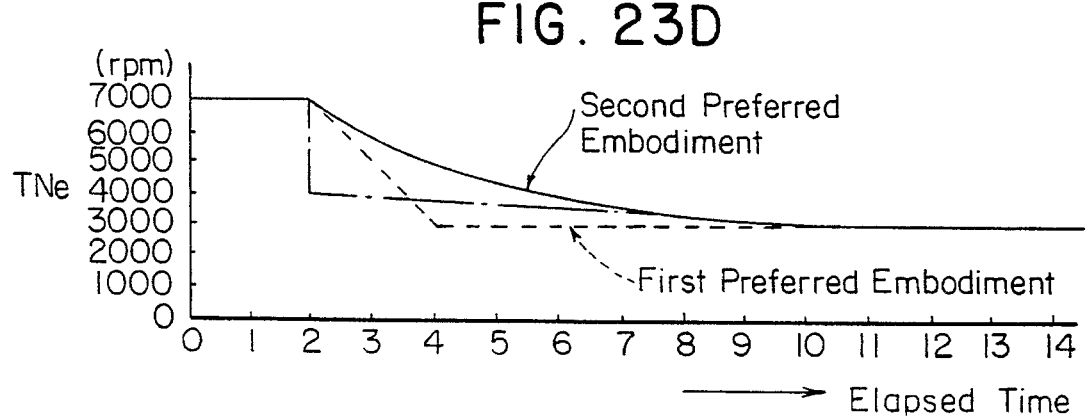

FIGS. 23(c) and 23(d) show changes in the engine load θth and the target engine speed TNe in obtaining a cruising condition by reducing the engine load θth from an accelerating condition to an intermediate opening. In the second preferred embodiment shown by a solid line in FIG. 23(d), the characteristic of θth≧5% in the decrease rate table shown in FIG. 15 is selected to obtain a relatively large decrease rate $-dC_1/dt$. As a result, the target engine speed TNe decreases to be shifted to the cruising condition without generating a strong engine brake. Also in the first preferred embodiment (shown by a broken line) and the conventional system (shown by a dot and dash line), the same final target engine speed TNe as that in the second preferred embodiment is reached.

In some vehicles wherein a change in engine brake hardly influences the behavior of the vehicle body, the four-point interpolation adopted in retrieving the decrease rate table may be eliminated by using two tables of θth=0% and θth>0% as a simple method. In this case, the effectiveness of the engine brake is reduced because the adaptation factor A is reduced to cause a reduction in the target engine speed TNe. However, if a deceleration by the engine brake is small, the driver does not feel any steps of the effectiveness of the engine brake due to the elimination of the four-point interpolation.

Further, according to the second preferred embodiment, a change in the target engine speed TNe can be made smooth in relation to every transitional change in the engine load θth, and can be made optimum in relation to engine characteristics and vehicle body behavior.

When opening the accelerator to accelerate a vehicle, for example, the increase rate of $C_1$ is set to increase with an increase in abscissa as apparent from the increase rate table shown in FIG. 14. Accordingly, when the accelerator is opened greatly, $C_1$ increases quickly, while when the accelerator is opened slightly, $C_1$ increases slowly. Thus, the degree of increase of $C_1$ can be optimally set according to the accelerator operation.

In addition, the axis of abscissa of the increase rate table shown in FIG. 14 represents θth–$C_1$ rather than θth. Accordingly, when increasing the engine load θth as shown in FIG. 24(a), the characteristic curve of $C_1$ becomes parabolic as shown by a solid line in FIG. 24(b) in such a manner that the increase rate of $C_1$ is large at first and is thereafter gradually reduced. As a result, as shown by a solid line in FIG. 24(c), the target engine speed TNe increases smoothly to effect smooth acceleration.

If $C_1$ is linearly increased as shown by a broken line in FIG. 24(b), the target engine speed TNe is also linearly increased as shown by a broken line in FIG. 24(c), and rapidly stops increasing at a point P. Accordingly, a change in acceleration and a rapid stop of the rise in engine sound are felt by the driver, thus deteriorating a drive feeling.

When closing the accelerator to shift from the accelerating condition to the cruising condition, the decrease rate $-dC_1/dt$ decreases with a decrease in the adaptation factor A because the characteristic curves in the decrease rate table shown in FIG. 15 have positive slopes with respect to the axis of abscissa. Accordingly, a decrease rate of the target engine speed TNe can be made in accordance with a natural decrease rate of the engine speed to thereby obtain a natural deceleration feeling. Further, in the approach to a cruising speed, the cruising speed is adjusted by the driver. The adjustment of the cruising speed can be readily performed by making changes in engine speed and speed ratio smooth and slow.

The effect by the vehicle body change quantity component $C_2$ of the adaptation factor A will now be described with reference to FIG. 25.

The vehicle body change quantity component $C_2$ is obtained as an average of vehicle accelerations G during a relatively long period of time, e.g., tens of seconds to several minutes, and the constant b is suitably selected to thereby reduce the vehicle body change quantity component $C_2$ and effect running at a low engine speed region with a low fuel consumption at a cruising mode, for example, where no acceleration is generated.

In contrast, in a sport mode where acceleration and deceleration are repeated, the vehicle body change quantity component $C_2$ is increased to increase the target engine speed TNe, thereby effecting running at a high engine speed region with a high engine output and a strong engine brake. In this manner, the running characteristics can be automatically changed according to a driver's performance by changing the adaptation factor A. The adaptation factor A may be obtained from various parameters to be described below instead of the above mentioned parameters.

For example, an engine crankshaft torque or a drive wheel torque may be used as the engine load component $C_1$ of the adaptation factor A. More specifically, the engine load component $C_1$ of the adaptation factor A may be decided by providing a torque sensor on a crankshaft or a drive wheel axle and averaging output voltages proportional to magnitudes of torque generated.

In cornering of a motorcycle, a throttle is once closed before a corner to decelerate, and is then opened in the corner. Accordingly, a throttle opening with respect to a vehicle speed during cornering is larger than that during cruising, so that the adaptation factor A is reduced to effect traction during cruising and prevent top-shift during banking. In this case, it is only necessary to correct θths in $A=a\theta ths+b\Delta Vs$ when the cornering is detected.

Further, as the vehicle body change quantity component $C_2$ of the adaptation factor A, (1) a lateral acceleration of a vehicle body, (2) an inclination of a sloping road, and (3) a cornering condition of a vehicle body may be used. The detailed description of these now follows in the above order.

(1) Lateral acceleration of a vehicle body.

This method is applied to a four-wheel vehicle or the like. A lateral acceleration sensor is provided on the vehicle body to detect a lateral acceleration acting in a lateral direction of the vehicle body in turning of the vehicle. As similar to the average acceleration Gs mentioned above, lateral accelerations detected by the lateral acceleration sensor are stored into a ring buffer to compute an average lateral acceleration LGs in a time interval of tens of seconds. Then, the vehicle body change quantity component $C_2$ of the adaptation factor A is obtained according to the average lateral acceleration LGs computed above. Preferably, the average vehicle speed change quantity $\Delta Vs$ is additionally used as the vehicle body change quantity component $C_2$. Accordingly, the adaptation factor A is computed as follows:

$$A=a\theta ths+b\Delta Vs+cLGs$$

(2) Inclination of a sloping road

In this method, an inclination of a sloping road, α, is computed, and the vehicle body change quantity component $C_2$ of the adaptation factor A is decided according to the inclination e computed above.

In general, a vehicle acceleration is computed as follows:

Vehicle acceleration=(drive wheel drag−running resistance)× (gravitational acceleration)/(vehicle weight+rider weight+rotational mass)  (A)

The running resistance is computed as follows:

Running resistance=(air resistance factor)×(vehicle speed)$^2$+(rolling resistance factor)×ω+ω sin α  (B)

where ω=(vehicle speed)/(effective tire radius)

The drive wheel drag is computed as follows: Drive wheel drag=(engine horsepower×efficiency×716×speed ratio)/(engine speed×effective tire radius)+tm  (C)

In the above expressions, the gravitational acceleration, the vehicle weight, the rider weight, the rotational mass, the air resistance factor, the rolling resistance factor, the effective tire radius, the efficiency, and the speed ratio are preliminarily stored as constants or supposed constants in the ROM 51. The vehicle acceleration, the vehicle speed, and the engine speed are detected in the above-mentioned manner. The running resistance is retrieved from the vehicle speed and the drive wheel torque according to a map shown in FIG. 27. The engine horsepower is retrieved from the engine speed and the engine load according to a map shown in FIG. 28.

The parameter sin α in Expression (B) is obtained from Expressions (A), (B), and (C), and the inclination α is accordingly obtained from the value of sin α. For example, a value obtained by multiplying a constant k by an absolute value of the inclination α is defined as the vehicle body change quantity component $C_2$ relating to the inclination α. Then, the adaptation factor A is finally computed as follows:

$$A=a\theta ths+b\Delta Vs+ck|\alpha|$$

(3) Cornering condition of a vehicle body This method is applied to a motorcycle. A pair of ultrasonic wave sensors are provided on right and left sides of the vehicle body to measure distances from the vehicle body on the right and left sides to a road surface and detect a bank angle β of the vehicle body according to a difference between outputs from both sensors. An average bank angle βs is computed from the bank angles β in a time interval of tens of seconds. When the average bank angle βs becomes a large value, the running mode is regarded as a sport mode, and the adaptation factor A is finally computed as follows:

$$A=a\theta ths+b\Delta Vs+c\beta s$$

Further, the adaptation factor A may be computed as $A=a\Delta\theta ths+b\Delta Vs$ where $\Delta\theta ths$ represents an average engine load change quantity. Alternatively, the adaptation factor A may be obtained by comparing aΔθths with bΔVs and adopting a larger one of both values.

Further, the adaptation factor A may be computed as a function of time t in addition to the engine load θth, i.e., A=f(θth, t). When the adaptation factor A changes from $A_1$ to $A_2$ as shown in FIG. 8, the adaptation factor A is expressed as a function of time t, e.g., $A=at+A_1$ or $A=(A_2-A_1)(1-e^{-at})+A_1$. In this case, the constant a is set to a value corresponding to an engine output characteristic or a speed change characteristic with respect to a throttle opening. It is preferable to select the value of the constant a between the case where the adaptation factor A increases and the case where it decreases so that the rate of change of the adaptation factor A in the decrease case may be smaller than that in the increase case. This is due to the fact that a driver's demand to drive fast with a high engine output must be met in a short time, and a driver's demand to drive slowly with a low engine output is sufficient to be met in a relatively long time.

Further, the maximum target engine speed $TNe_{max}$ and the minimum target engine speed $TNe_{min}$ may be obtained from the engine load θth as shown in FIG. 29. That is, the engine load θth is preliminarily converted into an adaptive value by correcting the engine load θth as a function of vehicle speed and time, and the maximum target engine speed $TNe_{max}$ and the minimum target engine speed $TNe_{min}$ are then obtained according to the adaptive value.

According to the first embodiment of the present invention, the map for obtaining the target engine speed is retrieved according to the adaptation factor, and the continuously variable transmission is controlled so that the actual engine speed becomes the target engine speed. Accordingly, the actual engine speed can be ensured according to a vehicle running condition, thereby improving the drivability, According to the second embodiment of the present invention, the adaptation factor as an element for obtaining the target engine speed is computed according to the function of the engine load component and time. Accordingly, the actual engine speed can be ensured according to a vehicle running condition, thereby improving the drivability.

According to the third embodiment of the present invention, the adaptation factor as an element for obtaining the target engine speed is computed according to the engine load component and the vehicle body change quantity component. Accordingly, the actual engine speed can be ensured according to a vehicle running condition, thereby improving the drivability.

According to the fourth embodiment of the present invention, the vehicle body change quantity of the adaptation factor is set as the function of the average vehicle speed change quantity or the average acceleration. Accordingly, a running characteristic suitable for frequently used acceleration and deceleration can be obtained.

According to the fifth embodiment of the present invention, when the engine load is larger than the engine load component of the adaptation factor, the engine load component is increased according to the difference between the engine load and the engine load component. That is, when the engine load is increased, the adaptation factor increases largely at first, and the rate of increase thereafter gradually decreases. Accordingly, the target engine speed can be smoothly increased to thereby effect smooth acceleration.

According to the sixth embodiment of the present invention, when the engine load is smaller than the engine load component of the adaptation factor, the engine load component is decreased according to the engine load and the adaptation factor or according to the engine load and the speed ratio of the continuously variable transmission. Accordingly, the decrease rate of the target engine speed can be made in accordance with the natural decrease rate of the actual engine speed to thereby obtain a natural deceleration feeling.

According to the seventh embodiment of the present invention, the target engine speed is computed by retrieving the first and second target engine speeds or the vehicle speed and interpolating the result of retrieval according to the adaptation factor. Accordingly, the target engine speed can be automatically controlled to optimum values fit for different driving modes such as cruising and sport running, thereby simplifying the driver's operation.

According to the eighth embodiment of the present invention, the target engine speed is computed from the information of the vehicle speed–target engine speed characteristic using the adaptation factor as a parameter. Accordingly, the target engine speed can be automatically controlled to optimum values fit for different driving modes such as cruising and sport running, thereby improving the operability.

According to the ninth embodiment of the present invention, the target engine speed is computed according to the vehicle speed and the vehicle speed change quantity, and the speed ratio of the continuously variable transmission is feedback controlled so that the actual engine speed accords with the target value. Accordingly, even when a running resistance or an engine output changes, no slip in the continuously variable transmission is felt by the driver, and a direct drive feeling as obtained in a gear transmission mounting vehicle can be obtained. Further, the minimum target engine speed and the maximum target engine speed are computed according to the adaptation factor obtained from a vehicle running condition, and the speed ratio of the continuously variable transmission is feedback controlled so that the minimum or maximum target engine speed is set to the target value when the target value is lower than the minimum target engine speed or higher than the maximum target engine speed. Accordingly, in the case of lack of a driving force, the target engine speed can be increased to recover the driving force.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An adaptive speed ratio control method for a continuously variable transmission of a vehicle having an engine, comprising the steps of:

computing an adaptation factor according to a function of an engine load component and time;

computing a target engine speed according to the adaptation factor; and controlling said continuously variable transmission so that an engine speed becomes the target engine speed, said step of computing an adaption factor comprising computing the adaptation factor by recursively adding a value of a previous adaptation factor to a value related to time.

2. An adaptive speed ratio control method for a continuously variable transmission of a vehicle having an engine, comprising the steps of:

computing an adaptation factor according to both an engine load component and a vehicle body change quantity component;

computing a target engine speed according to the adaptation factor; and controlling the continuously variable transmission so that an engine speed becomes the target engine speed, the vehicle body change quantity component of the adaptation factor being set as a function of either one of an average vehicle speed change quantity or an average vehicle acceleration.

3. The adaptive speed ratio control method for a continuously variable transmission according to claims 1 or 2, wherein said step of computing a target engine speed comprises determining the target engine speed by retrieving first and second target engine speeds or first and second vehicle speeds and interpolating the result of retrieval according to the adaptation factor.

4. The adaptive speed ratio control method for a continuously variable transmission according to claims 1 or 2, wherein the target engine speed is computed from information of a vehicle speed vs. target engine speed characteristic using the adaptation factor as a parameter.

5. An adaptive speed ratio control method for a continuously variable transmission of a vehicle having an engine comprising the steps of:

computing an adaptation factor according to a function of an engine load component and time;

computing a target engine speed according to the adaptation factor; and controlling said continuously variable transmission so that an engine speed becomes the target engine speed, when an engine load is larger than the engine load component of the adaptation factor, the engine load component is increased according to a difference between the engine load and the engine load component.

6. An adaptive speed ratio control method for a continuously variable transmission of a vehicle having an engine comprising the steps of:

computing an adaptation factor according to a function of an engine load component and time;

computing a target engine speed according to the adaptation factor; and controlling said continuously variable transmission so that an engine speed becomes the target engine speed, when an engine load is smaller than the engine load component of the adaptation factor, the engine load component is decreased according to the engine load and the adaptation factor or according to the engine load and a speed ratio of the continuously variable transmission.

7. A speed ratio control apparatus for feedback control of a speed ratio of a continuously variable transmission connected to an engine so that an actual engine speed corresponds with a target engine speed, the speed ratio control apparatus comprising:

adaptation factor computing means for computing an adaptation factor according to a vehicle running condition;

minimum target engine speed computing means for computing a minimum target engine speed according to a vehicle speed and the computed adaptation factor;

maximum target engine speed computing means for computing a maximum target engine speed according to the vehicle speed, the computed adaptation factor, and an engine speed;

target engine speed change quantity computing means for computing a target engine speed change quantity according to the vehicle speed and a vehicle speed change quantity;

target engine speed computing means for computing a present target engine speed according to a previous target engine speed and the computed target engine speed change quantity; and speed ratio control means for controlling the speed ratio of the continuously variable transmission with feedback so that the actual engine speed corresponds with a target value wherein the present target engine speed is set to the target value when the present target engine speed falls within a range between the minimum target engine speed and the maximum target engine speed, the minimum target engine speed is set to the target value when the present target engine speed is lower than the minimum target engine speed, and the maximum target engine speed is set to the target value when the present target engine speed is higher than the maximum target engine speed.

8. An adaptive speed ratio control apparatus for a continuously variable transmission of a vehicle having an engine, comprising:

means for computing an adaptation factor according to a function of an engine load component and time;

means for obtaining a target engine speed according to the adaptation factor;

means for controlling the continuously variable transmission so that an engine speed becomes the target engine speed;

means for determining when an engine load is larger than the engine load component of the adaptation faction; and means for increasing the engine load component according to a difference between the engine load and the engine load component.

9. An adaptive speed ratio control apparatus for a continuously variable transmission of a vehicle having an engine, comprising:

means for computing an adaptation factor according to both an engine load component and a vehicle body change quantity component;

means for obtaining a target engine speed according to the adaptation factor; and means for controlling the continuously variable transmission so that an engine speed becomes the target engine speed, the vehicle body change quantity component of the adaptation factor being a function of either one of average vehicle speed change quantity of an average acceleration quantity.

10. The adaptive speed ratio control apparatus for a continuously variable transmission according to claims 8 or 9, wherein said means for obtaining a target engine speed comprises computing means for computing the target engine speed by retrieving first and second target engine speeds from an engine sensor or a first and second vehicle speed from a vehicle speed sensor and interpolating a result of retrieval according to the adaptation factor.

11. The adaptive speed ratio control apparatus for a continuously variable transmission according to claims 8 or 9, wherein said means for obtaining a target engine speed comprises computing means for computing the target engine speed from information of a vehicle speed vs. target engine speed characteristic stored in a memory using the adaptation factor as a parameter.

12. An adaptive speed ratio control apparatus for a continuously variable transmission of a vehicle having an engine, comprising:

means for computing an adaptation factor according to a function of an engine load component and time;

means for obtaining a target engine speed according to the adaptation factor;

means for controlling the continuously variable transmission so that an engine speed becomes the target engine speed;

means for determining when an engine load is smaller than the engine load component of the adaptation factor; and means for decreasing the engine load component according to the engine load and the adaptation factor or according to the engine load and a speed ratio of the continuously variable transmission.

13. An adaptive speed ratio control method for a continuously variable transmission of a vehicle having an engine comprising the steps of:

computing an adaptation factor according to a function of an engine load component and time;

computing a target engine speed according to the adaptation factor; and controlling said continuously variable transmission so that an engine speed becomes the target engine speed, said step of computing an adaptation factor comprising computing the adaptation factor $$A=(A2-A1)(1-e^{-at})+A1$$

wherein A is the adaptation factor, A2 is an adaptation factor upper limit, $A_1$ is an adaptation factor lower limit, t is time and a is a constant.

14. The adaptive speed ratio control method according to claim 13, further comprising the step of setting the constant a to a value corresponding to an engine output characteristic or a speed change characteristic.

15. The adaptive speed ratio control method according to claim 13, further comprising the step of setting the constant a to a value such that a rate of change of A is greater when A is increasing than when A is decreasing.

16. An adaptive speed ratio control method for a continuously variable transmission of a vehicle having an engine, comprising the steps of:

a) determining an engine load quantity, b) determining a vehicle body change quantity, c) computing an adaptation factor having an engine load component related to said engine load quantity and a vehicle body change component related to said vehicle body change quantity, d) computing a target engine speed according to said adaptation factor, and e) controlling the continuously variable transmission so that an engine speed becomes Said target engine speed.

17. The adaptive speed ratio control method according to claim 16, wherein said step a) comprises finding an average value of the engine load quantity and wherein said step b) includes finding an average value of said vehicle body change quantity.

18. The adaptive speed ratio control method according to claim 17, further comprising the step of determining an average lateral acceleration of said vehicle and using said average lateral acceleration to compute said average value of said vehicle body change quantity.

19. The adaptive speed ratio control method according to claim 18, further comprising the step of computing said average value of said vehicle body change quantity from said average lateral acceleration and an average vehicle speed change quantity.

20. The adaptive speed ratio control method according to claim 16, wherein said step b) comprises computing said vehicle body change quantity from an average value of a vehicle speed change quantity or an average value of a vehicle acceleration.

21. The adaptive speed ratio control method according to claim 16, wherein said step e) comprises controlling the continuously variable transmission with feedback control.

22. The adaptive speed ratio control method according to claim 21, wherein said step e) comprises controlling the continuously variable transmission with proportional feedback control; proportional and integral feedback control; or proportional, integral and derivative feedback control.

23. The adaptive speed ratio control method according to claim 16, wherein said step a) comprises determining said engine load quantity according to a change in an engine load.

24. The adaptive speed ratio control method according to claim 23, wherein said step c) comprises comparing the change in an engine load to said vehicle body change quantity and computing the adaptation factor using only a larger of the change in an engine load and said vehicle body change quantity.

25. The speed ratio control method according to claim 16, further comprising the step of determining a value related to an inclination of a road surface on which said vehicle is riding and using said value to compute said vehicle body change quantity.

26. The adaptive speed ratio control method according to claim 25, wherein said step b) comprises determining said vehicle body change quantity from a value related to a vehicle speed change quantity and said value related to an inclination of a road surface on which said vehicle is riding.

27. The adaptive speed ratio control method according to claim 16, wherein said vehicle is a motorcycle, the adaptive speed ratio control method further comprising the step of determining a banking angle of said motorcycle and using said banking angle to determine said vehicle body change quantity.

28. The adaptive speed ratio control method according to claim 27, wherein said step b) comprises determining said vehicle body change quantity from said banking angle and a value related to a vehicle speed change quantity.

29. The adaptive speed ratio control method according to claims 2, 3, or 16, wherein said engine load component is determined from an engine load sensor.

30. The adaptive speed ratio control method according to claim 29, wherein said engine load sensor senses a position of a throttle valve in said engine, an intake manifold vacuum in said engine, an engine intake air quantity, an engine crankshaft torque, or a drivewheel torque of said vehicle.

31. An adaptive speed ratio control method for a continuously variable transmission of a vehicle having an engine, comprising the steps of:

a) determining a vehicle body change quantity, b) computing an adaptation factor according to a vehicle body change component which is related to said vehicle body change quantity, c) computing a target engine speed according to the adaptation factor, and d) controlling the continuously variable transmission so that an engine speed becomes the target engine speed.

32. The adaptive speed ratio control method according to claim 31, wherein said step a) comprises finding an average value of said vehicle body change quantity.

33. The adaptive speed ratio control method according to claim 32, further comprising the step of determining an average lateral acceleration of said vehicle and using said average lateral acceleration as said average value of said vehicle body change quantity.

34. The adaptive speed ratio control method according to claim 31, wherein said step a) comprises computing said vehicle body change quantity from an average value of a vehicle speed change quantity or an average value of a vehicle acceleration.

35. The adaptive speed ratio control method according to claim 31, further comprising the step of determining a value related to an inclination of a road surface on which said vehicle is riding and using said value as said vehicle body change quantity.

36. The adaptive speed ratio control method according to claim 31, wherein said vehicle is a motorcycle, the adaptive speed ratio control method further comprising the step of determining a banking angle of said motorcycle and using said banking angle to determine said vehicle body change quantity.

37. The adaptive speed ratio control method according to claim 31, wherein said step d) comprises controlling the continuously variable transmission with feedback control.

38. The adaptive speed ratio control method according to claim 37, wherein said step d) comprises controlling the continuously variable transmission with proportional feedback control; proportional and integral feedback control; or proportional, integral and derivative feedback control.

39. An adaptive speed ratio control method for a continuously variable transmission in a vehicle having an engine, the engine having at least a sport mode of operation with a relatively high engine output and a cruising mode of operation with a relatively low engine output, the adaptive speed ratio control method comprising the steps of:

determining speed changes of said vehicle;

determining accelerations of said vehicle;

automatically switching said continuously variable transmission to said sport mode if said speed changes are relatively frequent or if said accelerations are relatively frequent; and automatically switching said continuously variable transmission to said cruising mode if said speed changes are relatively infrequent or if said accelerations are relatively infrequent.

40. The adaptive speed ratio control apparatus according to claim 39, wherein said means for determining a vehicle body change quantity determines said vehicle body change quantity from an average value of a vehicle speed change quantity or an average value of a vehicle acceleration.

41. The adaptive speed ratio control apparatus according to claim 39, wherein said control means controls the continuously variable transmission with feedback control.

42. The adaptive speed ratio control apparatus according to claim 41, wherein said control means controls the continuously variable transmission with proportional feedback control; proportional and integral feedback control; or proportional, integral and derivative feedback control.

43. An adaptive speed ratio control apparatus for controlling a continuously variable transmission of a vehicle having an engine, comprising:

means for determining an engine load quantity, means for determining a vehicle body change quantity, means for computing an adaptation factor having an engine load component related to said engine load quantity and a vehicle body change component related to said vehicle body change quantity, means for computing a target engine speed according to the adaptation factor, and control means for controlling the continuously variable transmission so that an engine speed becomes the target engine speed.

44. The adaptive speed ratio control apparatus according to claim 43, wherein said means for determining an engine load quantity comprises means for determining an average value of said engine load quantity, and said means for determining a vehicle body change quantity includes means for determining an average value of said vehicle body change quantity.

45. The adaptive speed ratio control apparatus according to claim 44, further comprising means for determining an average lateral acceleration of said vehicle, said means for determining an average value of said vehicle body change quantity determines said average value of said vehicle body change quantity according to said average lateral acceleration.

46. The adaptive speed ratio control apparatus according to claim 45, wherein said means for determining an average value of said vehicle body change quantity computes said average value of said vehicle body change quantity from said average lateral acceleration and an average vehicle speed change quantity.

47. The adaptive speed ratio control apparatus according to claim 43, wherein said means for determining an engine load quantity comprises means for determining said engine load quantity according to a change in an engine load.

48. The adaptive speed ratio control apparatus according to claim 47, wherein said means for computing an adaptation factor comprises:

means for comparing the change in an engine load to said vehicle body change quantity; and adaptation means for computing the adaptation factor using only a larger of the change in an engine load and said vehicle body change quantity.

49. The adaptive speed ratio control apparatus according to claim 43, further comprising means for determining a value related to an inclination of a road surface on which said vehicle is riding, said means for computing a vehicle body change quantity computes said vehicle body change quantity according to said value related to an inclination of a road surface.

50. The adaptive speed ratio control apparatus according to claim 49, wherein said means for computing a vehicle body change quantity determines said vehicle change quantity from a value related to a vehicle speed change quantity and said value related to an inclination of a road surface on which said vehicle is riding.

51. The adaptive speed ratio control apparatus according to claim 43, wherein said vehicle is a motorcycle, the adaptive speed ratio control apparatus further comprising means for determining a banking angle of said motorcycle, said means for determining a vehicle body change quantity determines said vehicle body change quantity according to said banking angle.

52. The adaptive speed ratio control apparatus according to claim 51, wherein said means for determining a vehicle body change quantity determines said vehicle body change quantity from said banking angle and a value related to a vehicle speed change quantity.

53. An adaptive speed ratio control apparatus for a continuously variable transmission of a vehicle having an engine, comprising:

means for determining a vehicle body change quantity, means for computing an adaptation factor according to a vehicle body change component which is related to said vehicle body change quantity, means for computing a target engine speed according to the adaptation factor, and control means for controlling the continuously variable transmission so that an engine speed becomes the target engine speed.

54. The adaptive speed ratio control apparatus according to claim 53, wherein said means for determining a vehicle body change quantity determines said vehicle body change quantity based on an average value of said vehicle body change quantity.

55. The adaptive speed ratio control apparatus according to claim 54, wherein said means for determining a vehicle body change quantity determines said vehicle body change quantity based on an average lateral acceleration of said vehicle.

56. The adaptive speed ratio control apparatus according to claim 53, wherein said means for determining a vehicle body change quantity determines said vehicle body change quantity from an average value of a vehicle speed change quantity or an average value of a vehicle acceleration.

57. The adaptive speed ratio control apparatus according to claim 53, wherein said means for determining a vehicle body change quantity determines said vehicle body change quantity based on a value related to an inclination of a road surface on which said vehicle is riding.

58. The adaptive speed ratio control apparatus according to claim 53, wherein said vehicle is a motorcycle and wherein said means for determining a vehicle body change quantity determines said vehicle body change quantity based on a banking angle of said motorcycle.

59. The adaptive speed ratio control apparatus according to claim 53, wherein said control means controls the continuously variable transmission using feedback control.

60. The adaptive speed ratio control apparatus according to claim 59, wherein said control means controls the continuously variable transmission using proportional feedback control; proportional and integral feedback control; or proportional, integral and derivative feedback control.

* * * * *